US012730124B2

(12) United States Patent
Kolberg et al.

(10) Patent No.: US 12,730,124 B2
(45) Date of Patent: Sep. 8, 2026

(54) OPTICAL DISPLACEMENT SENSORS

(71) Applicant: SensiBel AS, Oslo (NO)

(72) Inventors: Sigbjørn Kolberg, Oslo (NO); Matthieu Lacolle, Oslo (NO); Hallvard Angelskår, Oslo (NO)

(73) Assignee: SensiBel AS, Oslo (NO)

( * ) Notice: Subject to any disclaimer, the term of this patent is extended or adjusted under 35 U.S.C. 154(b) by 287 days.

(21) Appl. No.: 18/624,318

(22) Filed: Apr. 2, 2024

(65) Prior Publication Data

US 2024/0329077 A1 Oct. 3, 2024

(30) Foreign Application Priority Data

Apr. 3, 2023 (GB) ..................................... 2304934

(51) Int. Cl.
*G01P 15/093* (2006.01)
*G01P 15/08* (2006.01)
*G01P 15/13* (2006.01)

(52) U.S. Cl.
CPC ........ *G01P 15/093* (2013.01); *G01P 15/0802* (2013.01); *G01P 15/13* (2013.01); *G01P 2015/084* (2013.01); *G01P 2015/0882* (2013.01); *G01P 15/131* (2013.01); *G01P 15/133* (2013.01)

(58) Field of Classification Search
CPC .... G01P 15/093; G01P 15/0802; G01P 15/13; G01P 15/133; G01P 15/131; G01P 2015/084; G01P 2015/0882
See application file for complete search history.

(56) References Cited

U.S. PATENT DOCUMENTS 5,218,420 A * 6/1993 Asmar .................. G01P 15/093 356/480
9,550,668 B1 * 1/2017 Xia ......................... B81B 7/007
9,650,239 B2 * 5/2017 Chu .......................... B81B 7/02
10,669,151 B2 6/2020 Strasser et al.
10,670,622 B2 6/2020 Johansen et al.
10,715,930 B2 7/2020 Bartl et al.
12,092,652 B2 * 9/2024 Gorman ................ G01P 15/093

(Continued)

*Primary Examiner* — Jonathan M Dunlap
(74) *Attorney, Agent, or Firm* — Taft Stettinius & Hollister LLP

(57) ABSTRACT

An optical accelerometer including an interferometric arrangement, a light source, a photodetector, a support structure that is static relative to the light source and photo detector, and a dual-layer membrane that is deflectable relative to the support structure. The dual-layer membrane includes first and second membrane layers that are mechanically coupled by a proof mass that is positioned between and attached to or integrally formed with the membrane layers. The interferometric arrangement includes a first optical element which includes or is disposed on a surface of one of the membrane layers and which is moveable relative to a second optical element which includes or is disposed on a surface of the support structure. The second optical element and at least part of the support structure are positioned between the membrane layers. The light source provides light to the interferometric arrangement and the photo detector detects an interference pattern generated by the light that is dependent on a distance between the first and second optical elements.

20 Claims, 14 Drawing Sheets

(56) References Cited

U.S. PATENT DOCUMENTS

2016/0060104 A1* 3/2016 Chu .......................... B81B 7/02
257/419
2023/0017010 A1* 1/2023 Gorman ................ G01P 15/093

* cited by examiner 2
4
42
46
16
12
30
24
28
26
18
20
22
34b
32
34a
40
14
8
10
36
44
6
38

Fig. 12K
220
220
220
220
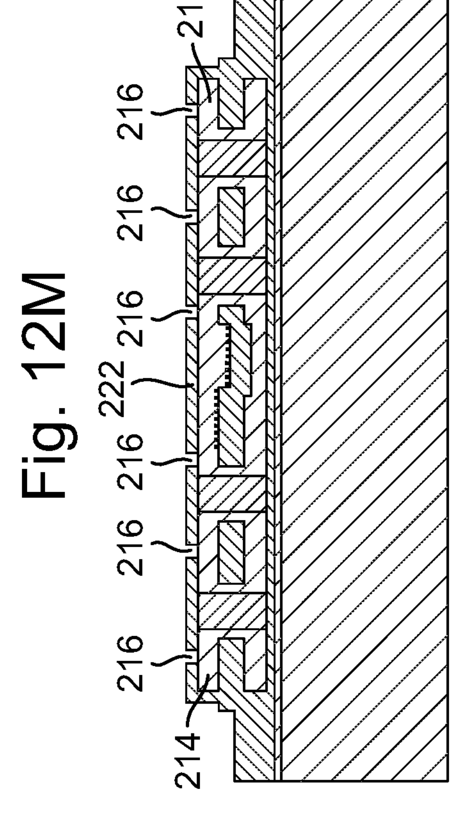
Fig. 12M
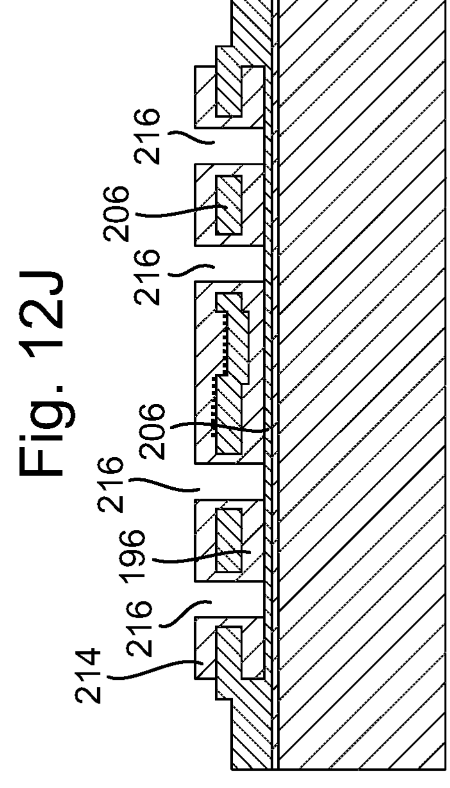
Fig. 12J
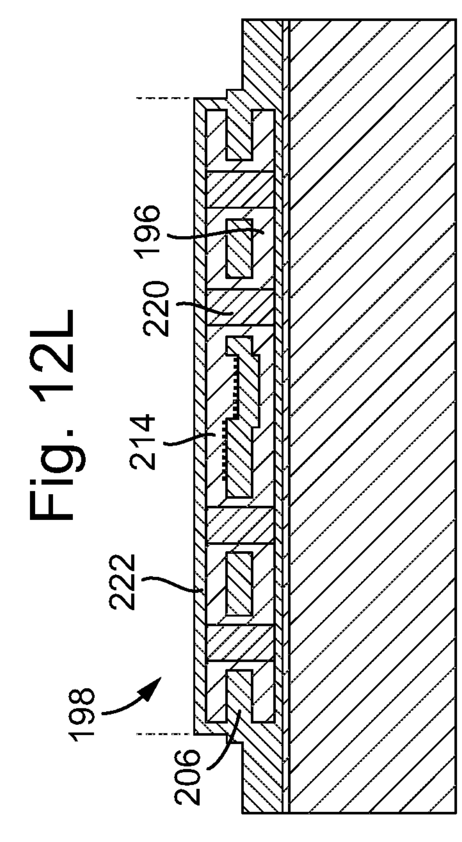
Fig. 12L

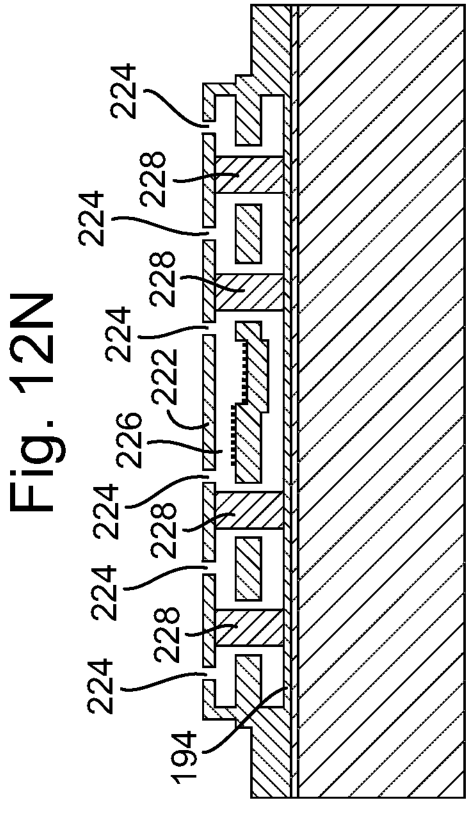
Fig. 12N
222
226
194
Fig. 12P
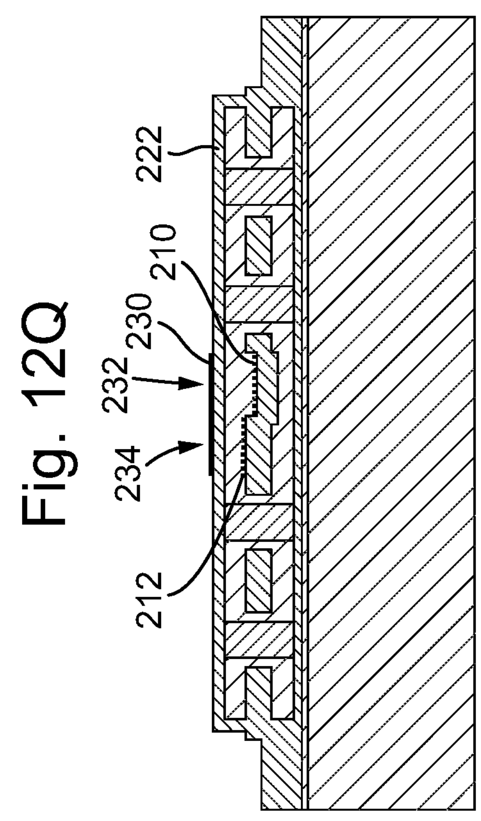
Fig. 12Q
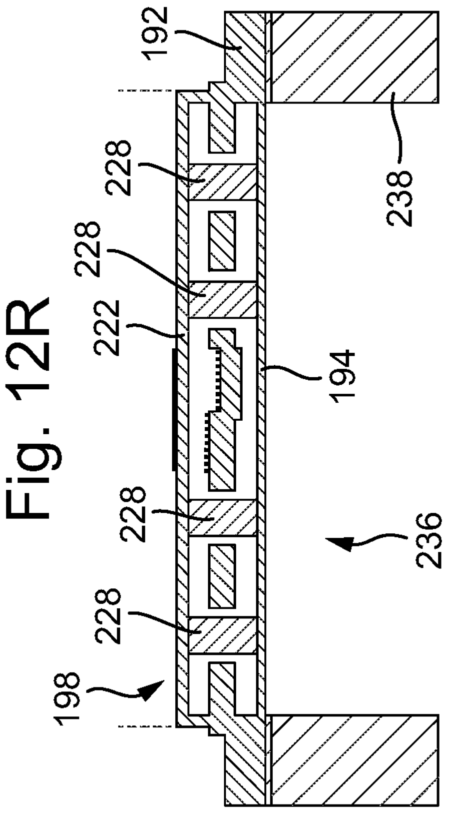
Fig. 12R 240
242
244
246
248
250
252
252
252
252
254
256
256
256
256
258
260
262
264
266
268
270
272
274
276
278
280a
280b
282
284

290
254
292
296
294
288
248
250
286

OPTICAL DISPLACEMENT SENSORS

CROSS REFERENCE TO RELATED APPLICATIONS

The subject application claims priority to United Kingdom Patent Application No. 2304934.9 filed Apr. 3, 2023, the contents of which are incorporated by reference in their entirety.

FIELD

This invention relates generally to optical displacement sensors such as optical accelerometers and optical microphones, in particular to optical accelerometers and optical microphones which may be manufactured as microelectromechanical systems (MEMS) devices, and to methods of using and manufacturing such optical accelerometers.

BACKGROUND

Various types of accelerometers are known in the art, typically based on the concept of providing a deflectable proof mass that is deflected when the accelerometer is subject to an acceleration or gravitational force. The deflection is measured in order to determine the magnitude and/or direction of the acceleration, or to determine the magnitude and/or direction of gravitational force (e.g. to determine the position and/or orientation of the accelerometer relative to the gravitational force).

One approach that is known in the art for measuring the deflection of a proof mass is optical interferometry. In accelerometers based on this approach, typically two optical elements are provided in an interferometric arrangement, wherein a light source is used to illuminate the interferometric arrangement to generate an interference pattern at a detector, such that the detected interference pattern depends on a separation distance between the two optical elements. One of the optical elements is provided on a proof mass that is deflectable relative to the light source, the detector and the other optical element (which are all static relative to each other). When the proof mass is deflected, the optical element on the proof mass moves relative to the other optical element, changing the separation between the optical elements. This gives rise to a change in the interference pattern at the detector. The change can be measured using the detector and can be used to calculate the deflection of the proof mass and thus to determine the acceleration or gravitational force acting on the accelerometer. A similar approach may be used to measure the deflection of a membrane of an optical microphone in response to an incoming acoustic wave.

The use of optical interferometry can provide accelerometers and microphones with good signal-to-noise ratio (SNR) and high sensitivity, but owing to the length-scale of the physical processes involved, optical accelerometers and optical microphones typically comprise small components (e.g. on the scale of micrometres) which can present challenges in manufacture. In this regard and more generally, further improvements in optical accelerometers and optical microphones and manufacturing methods therefor are desirable.

SUMMARY OF THE INVENTION

When viewed from a first aspect, the invention provides an optical accelerometer comprising:

an interferometric arrangement comprising a first optical element and a second optical element, wherein the first optical element is moveable with respect to the second optical element;

a light source; and at least one photo detector;

wherein the light source is disposed to provide light to the interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the first optical element and the second optical element, and the photo detector is disposed to detect at least part of an interference pattern generated by said first and second portions of light dependent on said optical path difference;

the optical accelerometer further comprising:

a support structure having a position that is static relative to the light source and the at least one photo detector, wherein the second optical element comprises a surface of the support structure and/or is disposed on a surface of the support structure;

a dual-layer membrane that is deflectable relative to the support structure, the dual-layer membrane comprising a first membrane layer, a second membrane layer spaced from the first membrane layer, and at least one proof mass positioned between the first and second membrane layers, wherein the proof mass is attached to or integrally formed with each of the first and second membrane layers so that the first and second membrane layers are mechanically coupled to move together in response to a deflecting force acting on the proof mass, and wherein the first optical element comprises a surface of the first membrane layer or is disposed on a surface of the first membrane layer;

wherein the second optical element and at least part of the support structure are positioned between the first and second membrane layers.

It will be appreciated that when an unbalanced force acts on the accelerometer, the proof mass moves relative to the support structure, causing the dual-layer membrane to be deflected relative to the support structure. For example, an unbalanced gravitational force may act on the proof mass causing the proof mass to be displaced, or the whole accelerometer may be subject to an acceleration such that the inertia of the proof mass causes the proof mass to be displaced relative to the support structure.

The displacement of the proof mass and the resulting deflection of the dual-layer membrane causes the first optical element to be displaced relative to the second optical element by an amount that depends on the unbalanced force or the acceleration. The optical path difference of the two portions of light changes by a corresponding amount, causing a change in the detected interference pattern. The detected change in the interference pattern can therefore be used to determine the change in the optical path difference and thus the amount of deflection of the proof mass, thereby allowing the force or acceleration to be determined. The skilled person will understand that in this context "static" means that the position of the support structure does not move, or moves by a negligible amount, relative to the light source and/or the photo detector(s) during use.

As noted above, the position of the support structure is static relative to the light source and/or the photo detector(s).

Preferably the support structure is rigid, e.g. made of a stiff material and/or having sufficient thickness so that it is static relative to the light source and/or the photo detector(s). There may be no contact between the support structure and the proof mass during use of the accelerometer, and the position of the support structure may be static owing at least in part to there being no contact between the support structure and the proof mass (i.e. such that the force on the proof mass is not transmitted to the support structure).

As noted above, in optical accelerometers in accordance with the present invention, at least one proof mass is positioned between and attached to or integrally formed with the first and second membrane layers. When it is said that the proof mass is "attached to" the first and second membrane layers, it is to be understood that the term "attached" does not imply that the proof mass and the membrane layers must necessarily be manufactured first as individual pieces and then subsequently attached to one another, although this is possible. For example, the materials from which the proof mass and the membrane layers are formed may be attached together first, and then the proof mass and the membrane layers may be formed from (e.g. involving etching) the materials subsequently. The phrase "attached to or integrally formed with" therefore encompasses all manners in which the proof mass and the membrane layers may be arranged such that they move together as a single unit when the dual-layer membrane is deflected.

The proof mass may be directly attached to or integrally formed with one or both of the first and second membrane layers. The proof mass may be indirectly attached to the first membrane layer and/or to the second membrane layer. For example, the proof mass may be attached to the first membrane layer and/or to the second membrane layers by connecting structures, e.g. posts.

When it is said that the proof mass is positioned between the first and second membrane layers, this includes the possibility that the proof mass is positioned entirely between the first and second membrane layers. However, this is not essential. The proof mass may extend beyond either or both of the first and second layers, i.e. so that a portion of the proof mass is outside of the region between the first and second membrane layers.

The Applicant has appreciated that arranging the proof mass in this way (i.e. between and attached to or integrally formed with the first and second membrane layers) may advantageously allow a larger proof mass (or larger proof masses) to be provided, e.g. compared with having a proof mass that is not supported between two membrane layers. The Applicant has also appreciated that arranging the at least one proof mass in this way may advantageously provide the optical accelerometer with an inherent low cross-axis sensitivity, i.e. the accelerometer may have a low sensitivity to accelerations that are not perpendicular to the plane of the dual-layer membrane. Having a low cross-axis sensitivity may advantageously improve the performance of the accelerometer. This property is also known in the art as "vector fidelity", wherein a low cross-axis sensitivity corresponds to a high vector fidelity of the accelerometer.

The first and second membrane layers may have a planar shape, e.g. such that there is a position (e.g. an equilibrium position or a particular displacement of the dual-layer membrane) at which the first and second membrane layers are flat. However, this is not essential and in some embodiments the first membrane layer and/or the second membrane layer may have a non-planar shape, e.g. they may comprise non-planar regions. The first and second membrane layers may be shaped for attachment to another part of the dual-layer membrane or of the optical accelerometer (e.g. to the proof mass or a periphery of the support structure). For example, the first and second membrane layers may comprise undulating regions (e.g. corrugations) and the first and second membrane layers may be attached to the proof mass at a peak or trough of the undulating regions.

The first and second membrane may be separated by a distance d, where d is between 3 μm and 1000 μm. In some embodiments the distance d may be between 3 μm and 100 μm, e.g. between 3 μm and 30 μm. In some embodiments the distance d may be between 100 μm and 1000 μm, e.g. between 200 μm and 1000 μm. Providing a relatively large gap (e.g. in the range set out above) between the membrane layers may allow a larger proof mass (or larger proof masses) to be provided. This may be advantageous—for example, a larger proof mass may increase the sensitivity of the optical accelerometer.

The dual-layer membrane may have an area (e.g. corresponding to an envelope defined by the perimeter or the first and second membrane layers) that is between 0.2 $mm^2$ and 2 $mm^2$, e.g. between 0.2 $mm^2$ and 1 $mm^2$.

As noted above, it may be beneficial to have for the at least one proof mass to be large to improve the sensitivity of the optical accelerometer.

The proof mass may have a mass, or the aggregate mass of all of the proof masses may be, between 1 μg and 5 mg. In some embodiments the mass or the aggregate mass may be between 1 μg and 100 μg. In some embodiments the mass or the aggregate mass may be between 100 μg and 1 mg. The skilled person will understand that increased sensitivity may be achieved through providing the proof mass with a relatively high mass (e.g. in the range set out above), and that for a given material of the proof mass(es), a greater mass can be provided by increasing the volume of the proof mass(es). While a greater mass could also be provided by using a material of higher density, certain material or materials may be preferred for other reasons (e.g. ease of manufacturability), so it may be beneficial to provide a higher mass by increasing the volume of the proof mass(es), rather than using a higher density material.

The proof mass may comprise or be made from silicon, poly-silicon, silicon nitride or a combination of two or more of these materials. The proof mass may comprise layers of some or all of these and/or other materials (e.g. a sandwich of materials).

The Applicant has also appreciated that when manufacturing membrane structures for devices such as MEMS (microelectromechanical systems) optical accelerometers, it may be advantageous (e.g. easier, faster, less expensive) to manufacture a membrane structure using surface micromachining. Surface micromachining is a manufacturing process generally known in the art, in which microstructures are formed by depositing and etching layers of material, e.g. over a substrate.

However, the Applicant has also appreciated that the process of surface micromachining has limitations, and in particular, it can be difficult to manufacture dual-layer membranes with a large gap between the membrane layers. The benefits of using surface micromachining may therefore be difficult or impossible to attain if manufacturing a dual-layer membrane with a large gap, i.e. for which surface micromachining is not suitable. Similarly, the benefits of having a large gap between the membrane layers to support a large proof mass may be unattainable if using surface micromachining.

The Applicant has appreciated that by providing the configuration for an optical accelerometer as defined above, the benefits of using surface micromachining may be attained for dual-layer membranes with relatively large gaps and relatively large proof masses. Specifically, by providing the second optical element on or as part of a support structure that is at least partly between the first and second membrane layers, a dual-layer membrane is defined that can be both i) manufactured using surface micromachining and ii) provided with a large gap between the membrane layers and with a large proof mass or large proof masses. The optical accelerometer and the dual-layer membrane may thus be described as being optimized for surface micromachining as a manufacturing method for at least the dual-layer membrane.

In addition, providing the second optical element between the first and second membrane layers may confer other benefits, e.g. it may allow the first and second optical components to be provided closer together (which may improve the optical efficiency of the readout of the optical accelerometer). This advantage may be significant in particular in embodiments in which at the least the volume between the first and second membrane layers is at low pressure or vacuum (as discussed further below), as this allows the optical elements to be provided closer together without introducing significant squeeze film effects.

In a set of embodiments, at least part of the optical accelerometer (e.g. including at least the dual-layer membrane) is manufactured using surface micromachining. Other parts of the optical accelerometer besides the dual-layer membrane may be manufactured using surface micromachining, e.g. as part of the same surface micromachining process used to manufacture the dual-layer membrane. For example, the light source and/or the photo detector(s) may be provided on a readout structure (e.g. comprising a substrate and/or superstrate) that forms part of the optical accelerometer. The readout structure and the dual-layer membrane may be manufactured together using surface micromachining, e.g. to provide a component comprising the light source and/or the photo detector(s) and the dual-layer membrane. The component manufactured in this way may be more compact (e.g. thinner) than an equivalent component manufactured using other methods (e.g. wafer bonding), while still providing a large gap between the first and second membrane layers.

This aspect of the invention extends to a method of manufacturing the optical accelerometer as defined above, the method comprising manufacturing at least part of the optical accelerometer using surface micromachining. The method may comprise manufacturing the dual-layer membrane using surface micromachining. The light source and/or the photo detector(s) may be provided on a readout structure (e.g. comprising a substrate and/or a superstrate), and the method may comprise manufacturing the readout structure together with the dual-layer membrane using surface micromachining.

Manufacturing a dual-layer membrane for an optical accelerometer using surface micromachining is novel and inventive in its own right, and thus when viewed from a second aspect the invention provides a method of manufacturing a deflectable dual-layer membrane for an optical accelerometer, the method comprising:

i) depositing a bottom membrane layer over a substrate wafer;
ii) depositing a sacrificial layer over the bottom membrane layer;
iii) etching at least one cavity in the sacrificial layer, wherein the at least one cavity extends through the sacrificial layer to expose a respective area of the bottom membrane layer;
iv) depositing proof mass material to fill the or each cavity;
v) depositing a top membrane layer over the sacrificial layer and the proof mass material;
vi) etching one or more holes in the top membrane layer to expose respective areas of the sacrificial layer;
vii) removing at least part of the sacrificial layer to leave a void between the top and bottom membrane layers and around the proof mass material, so that the proof mass material is attached to or integrally formed with the top and bottom membrane layers; and
viii) etching the substrate wafer beneath the bottom membrane layer to remove a portion of the substrate wafer, leaving a peripheral portion of the substrate wafer supporting the bottom and top membrane layers, such that the bottom membrane layer, the proof mass material and the top membrane layer together form the deflectable dual-membrane structure.

This aspect of the invention extends to a method of manufacturing an optical accelerometer, the optical accelerometer comprising a deflectable dual-layer membrane, the method comprising manufacturing the deflectable dual-layer membrane according to the method of manufacture defined above.

It is to be understood that relative positional terms such as "top", "bottom", "over", etc. are used only for convenience to define the relative positions of different portions, layers, etc. of the dual-layer membrane by describing their positional relationship when the substrate and material layers from which the dual-layer membrane is made are viewed with the layers oriented horizontally and with the substrate at the bottom. It does not imply any requirement regarding the orientation of the dual-layer membrane during use or during manufacture.

It is also to be understood that when a layer or material is described as being deposited "over" another layer, material or region, while the layer or material may be deposited directly on that other layer, material or region, this is not necessarily the case for all embodiments. For example, in some embodiments there may be one or more other layers in between.

It is also to be understood that the order in which the steps of the method of manufacture are listed does not necessarily imply that those steps must be performed in that order. It will be appreciated that for some steps an order may be implicit, i.e. when it is not physically possible to perform those steps in any other order. However, in general, the recited steps may be performed in any suitable order.

In a set of embodiments, the method of manufacture further comprises:

depositing a support structure layer over the sacrificial layer; and depositing a further sacrificial layer over the support structure layer, wherein the step of depositing the top membrane layer comprises depositing the top membrane layer over (e.g. directly on) the further sacrificial layer;

wherein the step of etching at least one cavity in the sacrificial layer comprises etching the at least one cavity through the further sacrificial layer, the support structure layer and the sacrificial layer; and wherein the step of removing at least part of the sacrificial layer to leave a void between the top and bottom membrane layers comprises removing at least part of the further sacrificial layer.

The method may comprise depositing sacrificial material to cover a respective inner surface surrounding the or each cavity, leaving exposed at least a part of the respective area of the bottom membrane layer, wherein the step of removing the sacrificial layer to leave a void between the top and bottom membrane layers further comprises removing the sacrificial material. This means that when the proof mass material is used to fill the or each cavity, the sacrificial material prevents the proof mass material contacting the support structure layer. Thus when the sacrificial material is removed, a gap is left between the proof mass material and the support structure layer, allowing the proof mass material to move relative to the support structure layer when the dual-layer membrane is deflected.

The method may comprise etching the sacrificial layer to expose the bottom membrane layer in a peripheral region surrounding a retained region of the sacrificial layer corresponding to a membrane envelope. The top membrane layer (or the support structure layer, where provided) may be deposited such that in said peripheral region, the top membrane layer (or the support structure layer, where provided) is deposited directly on the bottom membrane layer.

The method may comprise a step of planarizing a surface defined by one or more of the deposited layers or materials to flatten the surface. This step may be after step iv), e.g. immediately after. This may advantageously help to make the top and/or bottom membrane layers flatter. For example, the sacrificial layer (or the further sacrificial layer) and the proof mass material may be planarized before the top membrane layer is deposited. The top membrane layer and/or the bottom membrane layer may be directly planarized.

The skilled person will understand that when a layer or material is etched in a selective way (e.g. to remove a region of a layer or to etching cavities/holes in the layer, this may be achieved using techniques known in the art of surface micromachining, e.g. patterning one or more layers prior to etching, or depositing an etch stop layer over the substrate wafer before depositing the bottom membrane layer, so that when the substrate wafer is etched in step viii), the etch stop layer stops the etching process so that the bottom membrane layer is retained.

The method of manufacture may comprise providing (e.g. depositing or etching) a first optical element in or on the bottom membrane layer or the top membrane layer. The method may comprise providing (e.g. depositing or etching) a second optical element in or on support structure layer. The first and second optical elements may have any or all of the features described herein with reference to the first aspect.

The method may comprise etching one or more recesses in the sacrificial layer, the further sacrificial layer, the support structure layer, the top membrane layer or the bottom membrane layer. This may create regions of different heights in the bottom membrane layer, the top membrane layer or the support structure layer. One of the first or second optical elements and further optical elements on may be provided (e.g. deposited on or etched in) on a respective one of the regions of different height. This may allow an optical accelerometer of increased dynamic range to be provided, as discussed in more detail below.

The method of manufacture may comprise plugging the holes in the top membrane layer. The method of manufacture may comprise adjusting the pressure in the void prior to plugging the holes in the top membrane layer, e.g. adjusting the pressure to a lower pressure, e.g. to vacuum.

It is also to be understood that the layers and materials mentioned above are labelled by their function in the manufacturing process (e.g. sacrificial layer, etch stop layer) or by their position/function in the dual-layer membrane (e.g. top membrane layer, proof mass material, support structure layer). Each layer or material may be or comprise any suitable material (e.g. "proof mass material" may be understood as meaning material suitable for manufacturing a proof mass). Some layers or materials may be or comprise the same material(s) as one or more other layers or materials mentioned above. For example, the proof mass material may be the same material used to form the top and bottom membrane layers (e.g. corresponding to the case that the resulting proof mass is 'integrally formed with' the top and bottom membrane layers).

The top membrane layer and/or the bottom membrane layer may be or comprise silicon nitride and/or poly-silicon. The support structure layer may be or comprise silicon nitride and/or poly-silicon. The proof mass material may be silicon nitride, poly-silicon, silicon, or a combination or two or more of these or other materials. The proof mass may comprise layers of some or all of these and/or other materials. For example, the proof mass may comprise a first layer made from silicon nitride and/or poly-silicon, a second layer made from silicon, a third layer made from silicon nitride and/or poly-silicon, a fourth layer made from silicon, and a fifth layer made from silicon nitride and/or poly-silicon. The substrate wafer may be a silicon wafer. The etch stop layer may be or comprise $SiO_2$. The sacrificial layer, the further sacrificial layer and/or the sacrificial material may be or comprise $SiO_2$.

Optional features of the first aspect may, where applicable, also be features of the second aspect, and vice versa. The methods of manufacture defined in accordance with the second aspect may comprise a step or steps of providing, in the optical accelerometer or the dual-layer membrane, any of the optical structural features defined above for the first aspect. The top and bottom membrane layers of the second aspect may correspond to the first and second membrane layers respectively of the first aspect, or the top and bottom membrane layers of the second aspect may correspond to the second and first membrane layers respectively of the first aspect.

The optical accelerometer may comprise more than one proof mass. For example, the optical accelerometer may have 2, 3, 4, 5, 6 or more than 6 proof masses. The method of manufacture may comprise etching more than one cavity (e.g. 2, 3, 4, 5, 6 or more than 6 cavities) and filling the cavities with proof mass material. The proof masses (or cavities) may be arranged in a symmetric arrangement, e.g. evenly spaced around a centre point of the dual-membrane structure (e.g. around the first and second optical elements).

The optical accelerometer may comprise pillars extending between the first and second membrane layers, wherein the pillars are attached to or integrally formed with the first and second membrane layers. It is to be understood that in this context, a pillar is distinct from a proof mass in that it does not have sufficient mass to function effectively as a proof mass. The skilled person will understand the differences between a pillar and a proof mass that are implicit in this distinction. For example, a pillar is typically significantly lighter (and therefore in this context may be thinner) than a proof mass, and may be made from a different material. The pillars may provide additional mechanical coupling between the first and second membrane layers. The pillars may help to support the first and second membrane layers and may help to maintain a constant spacing between the first and second membrane layers to help them move together when the proof mass is deflected in response to a deflecting force or acceleration.

The support structure may comprise one or more respective holes to accommodate the proof mass(es) and, where provided, the pillar(s). The proof mass(es) and, where provided, the pillar(s) may extend between the first and second membrane layers through the respective holes.

The first optical element and the second optical element may be or comprise any suitable optical elements in any suitable combination that provide the function of an interferometer that can be used to generate an interference pattern at the photo detector(s) that is dependent on the distance between the first and second optical elements.

The first optical element may be a diffractive optical element, e.g. a diffraction grating or a diffractive lens. The first optical element may comprise grating lines provided in or on (e.g. deposited on or etched in or through) the surface of the first membrane layer. The first optical element may be a reflective optical element, e.g. a reflective coating. The first optical element may be simply an interface (i.e. a surface) between the material of the membrane and the adjacent or ambient material or region.

The second optical element may be a diffractive optical element, e.g. a diffraction grating or a diffractive lens. The second optical element may comprise grating lines provided in or on (e.g. deposited on or etched in or through) the surface of the support structure. The second optical element may be a reflective optical element, e.g. a reflective coating. The second optical element may be simply an interface (i.e. a surface) between the material of the support structure and the adjacent or ambient material or region.

In a set of embodiments, the first optical element is a diffractive optical element and the second optical element is a reflective optical element, and vice versa in some other embodiments. In a set of embodiments, both the first and second optical elements are reflective surfaces, e.g. such that the interferometric arrangement is a Fabry-Pérot interferometric arrangement. In a set of embodiments, both the first and second optical elements are diffractive optical elements.

In a set of embodiments, the first optical element comprises a first plurality of elongate reflective surfaces and a first plurality of elongate openings arranged alternately with the first plurality of elongate reflective surfaces to form a first diffractive structure in a first plane; and the second optical element comprises a second plurality of elongate reflective surfaces and a second plurality of elongate openings arranged alternately with the second plurality of elongate reflective surfaces to form a second diffractive structure in a second plane; wherein the first and second planes are co-planar either when the dual-layer membrane is in an equilibrium position or when the dual-layer membrane is in a deflected position; and wherein when the first and second planes are co-planar, the first plurality of elongate reflective surfaces are positioned in the second plurality of elongate openings. Such embodiments are referred to herein for convenience as "embodiments comprising interlaced fingers".

The support structure may comprise one or more protruding portions, e.g. a plurality of protruding walls, wherein each elongate reflective surface of the second plurality of elongate reflective surfaces is provided on or comprises a respective distal surface of the protruding portion(s) e.g. of a respective one of said walls. The first membrane layer may have formed therein (e.g. etched therein) the first plurality of elongate openings, wherein the first plurality of elongate reflective surfaces is provided on or comprises material of the first membrane between said elongate openings.

The first membrane layer may comprise one or more protruding portions, e.g. a plurality of protruding walls, wherein each elongate reflective surface of the first plurality of elongate reflective surfaces is provided on or comprises a respective distal surface of the protruding portion(s) e.g. of a respective one of said walls. The support structure may have formed therein (e.g. etched therein) the second plurality of elongate openings, wherein the second plurality of elongate reflective surfaces is provided on or comprises material of the support structure between said elongate openings.

As used herein, "opening" may refer to a gap, hole or recess. An "opening" may, but does not necessarily, mean a hole that extends fully through the element in which it is formed.

Thus it can be seen that in the above-mentioned set of embodiments, when the first and second planes are not co-planar, the first and second optical elements have the form of respective first and second diffractive structures, where the separation between the first and second diffractive structures depends on the extent of deflection of the dual-layer membrane. It can also be seen that when the separation is zero, the first and second plurality of elongate reflective surfaces interleave to form an effective single reflective surface. Thus, as the dual-layer membrane is deflected in response to a force or an acceleration, the first optical element moves through a range of positions corresponding to a reflective surface (zero separation between the first and second diffractive structures) and a composite diffractive structure (corresponding to a range of non-zero separations between the first and second diffractive structures). This creates an interference pattern at the photo detector(s) that can be used to determine the displacement of the dual-layer membrane and the proof mass, and thus to determine the deflecting force or acceleration.

It will be appreciated from the above disclosure that the may be some positions of the first optical element in which the first plurality of elongate reflective surfaces have passed through the second plurality of elongate openings, such that the first optical element is not positioned between the first and second membrane layers.

It is therefore to be understood that when it is said that the second optical element is positioned between the first and second membrane layers, this means that the second optical element is positioned between the first and second membrane layers during at least one of: i) when the dual-layer membrane is in an equilibrium position and ii) when the dual-layer membrane is in a deflected position. The second optical element may be positioned between the first and second membrane layers at all times, i.e. both when the dual-layer membrane is in an equilibrium position and when the dual-layer membrane is in a deflected position. The dual-layer membrane may have an equilibrium position in which the first optical element is not between the first and second membrane layers (i.e. so that the first optical element is only positioned between the first and second membrane layers when the dual-layer membrane is in some deflected positions). However, preferably when the dual-layer membrane is in the equilibrium position, either the first and second planes are co-planar, or the first optical element is between the first and second membrane layers.

When it is said that an element (or part thereof) is "between the first and second membrane layers", may be understood to mean that said element (or said part thereof) is positioned within a volume delimited by the first and second membrane layers and a boundary defined by the perimeters of the first and second membrane layers (e.g. so that said element or part thereof is within the perimeter of both membrane layers).

One or both of the first and second membrane layers may be imperforate (i.e. do not contain any holes). The volume between the membrane layers may be fully enclosed, e.g. hermetically sealed, e.g. by means of a sealing peripheral mount that supports the membrane layers. The volume between the membrane layers may be at a lower pressure (e.g. at least 10 times lower) than the ambient pressure of the region immediately outside of the volume between the membrane layers. For example, the volume between the membrane layers may comprise an effective vacuum.

The optical accelerometer or at least part thereof, e.g. at least the dual-membrane, the light source and the photo detector(s), may be sealed inside a packaging (e.g. comprising a base and an enclosure) wherein the volume inside the packaging is at a lower pressure (e.g. at least 10 times lower) than the ambient pressure of the region immediately outside of the packaging. For example, the volume inside the packaging may comprise an effective vacuum. It will be understood that in embodiments in which the volume between the membrane layers is not completely enclosed, this means that the volume between the membrane layers would also be at the lower pressure, e.g. vacuum.

Providing the volume between the membrane layers at a lower pressure or vacuum may be advantageous in reducing squeeze film effects as the dual-membrane moves relative to the support structure. This may be particularly advantageous in some embodiments comprising interlaced fingers at discussed above, especially in embodiments comprising a plurality of protruding walls, as squeeze film effects may otherwise be significant in such arrangements.

Providing the volume inside the packaging at low pressure or vacuum may advantageously help to isolate the dual-layer membrane from external pressure stimulation, e.g. to reduce or avoid deflections in the dual-layer membrane that are caused by incoming acoustic waves.

In a set of embodiments, the optical accelerometer is configured to use closed loop feedback to balance a force on the proof mass due to gravity or to damp a resonance in the accelerometer response to an acceleration. The invention extends to a method of using the optical accelerometer of the first aspect or an optical accelerometer manufactured in accordance with the second aspect, the method comprising using closed loop feedback to balance a force on the proof mass due to gravity and/or using closed loop feedback to damp a resonance in the accelerometer response to an acceleration.

The skilled person will understand that, in the context of accelerometers, closed loop feedback is a technique in which the displacement of the proof mass is determined (e.g. in this context of the present invention, by determining the deflection of the dual-layer membrane) and a force is applied (e.g. an electrostatic force) to balance or compensate for the displacement of the proof mass. The use of closed loop feedback as described herein in the context of the present invention may provide certain advantages, as discussed further below.

In some embodiments, the support structure and one or both of the first membrane layer and the second membrane layer are conductive, e.g. formed from a conductive material, e.g. doped polysilicon. The optical accelerometer may be configured in use to apply a voltage between the support structure and the conductive membrane(s) to provide closed loop feedback. The method may comprise applying a voltage between the support structure and the conductive membrane layer(s) to provide closed loop feedback.

Where the support structure and the first and/or second membrane layers are conductive, they may not be transparent or sufficiently transparent to allow light to pass through. Where the support structure, the first membrane layer and/or the second membrane layer is/are formed from a conductive material, said support structure, said first membrane layer and/or said second membrane layer may comprise a region formed from a transparent material (e.g. $Si_3N_4$) or an aperture to allow the light from the light source and/or the first and second light portions to pass therethrough.

In some embodiments, the optical accelerometer comprises a piezo actuator on the first membrane layer, the second membrane layer or the support structure to provide closed loop feedback. The method may comprise using the piezo actuator to provide closed loop feedback.

The dual-layer membrane may render optical accelerometers in accordance with the present invention particularly suitable for closed loop feedback, owing to the presence of a membrane layer on each side of the support structure. Preferably both of the first and second membrane layers are conductive and the voltage is applied between the support structure and both of the first and second membrane layers.

The use of closed loop feedback in optical accelerometers in accordance with the present invention may be particularly useful owing to the large proof mass that can be provided in said optical accelerometers. It is desirable to provide a sensitive optical accelerometer, and providing a large proof mass (especially if providing first and second membrane layers with a high compliance) can help to achieve high sensitivity.

However, a large proof mass (especially in conjunction with high compliance membrane layers) means that there may be a significant deflection of the dual-layer membrane solely from the weight of the membrane under gravity. For improved accelerometer accuracy and dynamic range, it may be preferable not to have such a deflection. Closed loop feedback may be used to balance the force on the proof mass due to gravity, so that the proof mass equilibrium position may be adjusted the position that the proof mass would adopt in the absence of gravity (e.g. a position in which the dual-layer membrane is undeflected or substantially undeflected).

A large proof mass (especially in conjunction with high compliance membranes) may also result in the optical accelerometer having a low resonant frequency, e.g. which may correspond to motions/accelerations that are typically present when the accelerometer is in use, but which may not correspond to the motions/accelerations of interest that are intended to be measured by the accelerometer. Providing closed loop feedback in optical accelerometers in accordance with embodiments of the present invention may advantageously allow those low frequency resonances to be damped to improve the benefit obtained from having a large proof mass.

As mentioned above, providing first and second membrane layers that have a high compliance may be advantageous, e.g. helping to improve the sensitivity of the accelerometer. As the person skilled in the art will understand, compliance in this context provides a measure of the degree of displacement of a membrane per unit force on the membrane (which may also be expressed in terms of displacement per unit pressure). A high compliance membrane is therefore deflected to a greater degree that a low compliance membrane for a given amount of force or pressure applied to the membrane (or applied to a proof mass attached to or integrally formed with the membrane). The first and second membrane layers may have one or more tension-relieving structures (e.g. corrugations) formed therein, e.g. at a periphery of the first and second membrane layers. Such tension-relieving structures may increase the compliance of the first and second membrane layers.

The light source and the photo detector(s) may be disposed on opposite sides on the dual-layer membrane, but preferably they are disposed on the same side of the dual-layer membrane. The optical accelerometer may comprise a readout structure, e.g. a semiconductor chip, e.g. an ASIC (application-specific integrated circuit) chip. One or more readout components (e.g. including the light source and/or the photo detectors and/or a circuit) may be provided on the readout structure (e.g. mounted on or integrated with) a semiconductor chip or ASIC chip). Additionally or alternatively, in some embodiments, one or more readout components—e.g. the light source and/or the detectors may be positioned between the first and second membrane, e.g. on the support structure, e.g. on a side of the support structure opposite from the second optical element.

The dual-layer membrane maybe be oriented so that the first membrane layer is facing the light source and the photo detector(s), i.e. closer to the light source and the photo detector(s) than the second membrane layer. The light from the light source may therefore impinge on the first and second optical elements without passing through the second membrane layer first. The first and second portions of light, after passing through the interferometric arrangement, may impinge on the photo detector(s) without passing through the second membrane layer first.

However, this is not essential. The dual-layer membrane maybe be oriented so that the first membrane layer is facing away from the light source and/or the photo detector(s). The light from the light source may therefore pass through the second membrane layer before impinging on the first and second optical elements. Similarly, after passing through the interferometric arrangement, the first and second portions of light may pass through the second membrane layer before impinging on the photo detector(s).

The second membrane layer may be transparent at the wavelength of the light from the light source. The second membrane layer may be provided with an anti-reflection coating on one or both surfaces thereof. This may aid the transmission of the light or the first and second light portions through the second membrane layer. The second membrane layer may comprise an aperture positioned to allow the light or the first and second portions of light to pass therethrough.

The second optical element may be disposed on or may comprise a surface of the support structure that faces towards the first membrane layer or that faces away from the first membrane layer. Thus it will be appreciated that in some embodiments, the light and/or the first and second light portions may pass through the support structure. The support structure may be transparent at the wavelength of the light from the light source. The support structure may be provided with an anti-reflection coating on the surface opposite to the surface with the second optical element. The first membrane layer is preferably transparent at the wavelength of the light from the light source and may be provided with an anti-reflection coating on the surface opposite to the surface with the first optical element.

The skilled person will understand that in this context, if an element or material is described as "transparent" at a given wavelength, this may be understood to mean that the element or material transmits all or substantially light at that wavelength, e.g. it may transmit more than 90% or more than 95% percent of the light at that wavelength.

The light source may be a vertical-cavity surface-emitting laser (VCSEL).

The first membrane layer or the support structure may comprise one or more regions of different height, e.g. one or more steps or recesses. Where the first membrane layer comprises one or more regions of different height, the first optical element may comprise or be disposed on a surface one of said regions, wherein a further optical element (e.g. which is the same as the first optical element) may comprise or be disposed on a surface of one of a respective one of each other region of said regions. Where the support structure comprises one or more regions of different height, the second optical element may comprise or be disposed on a surface of one of said regions, wherein a further optical element (e.g. which is the same as the second optical element) may comprise or be disposed on a surface of one of a respective one of each other region of said regions.

Each optical element on the regions of different height may therefore form a respective interferometric arrangement with the first optical element (in the case that the regions of different height are provided in the support structure) or with second optical element (in the case that the regions of different height are provided in the first membrane). The displacement of the dual-layer membrane relative to the support structure may thus be measured with respect to a different working point for each interferometric arrangement, thereby extending the working range of the optical accelerometer.

When viewed from a third aspect, the invention provides an optical displacement sensor comprising:

an interferometric arrangement comprising a first optical element and a second optical element, wherein the first optical element is moveable with respect to the second optical element;

a light source; and at least one photo detector;

wherein the light source is disposed to provide light to the interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the first optical element and the second optical element, and the photo detector is disposed to detect at least part of an interference pattern generated by said first and second portions of light dependent on said optical path difference;

the optical displacement sensor further comprising:

a support structure having a position that is static relative to the light source and the at least one photo detector, wherein the second optical element comprises a surface of the support structure and/or is disposed on a surface of the support structure;

a dual-layer membrane that is deflectable relative to the support structure, the dual-layer membrane comprising a first membrane layer and a second membrane layer spaced from the first membrane layer, wherein the first and second membrane layers are mechanically coupled to move together in response to a deflecting force acting on the dual-layer membrane, and wherein the first optical element comprises a surface of the first membrane layer or is disposed on a surface of the first membrane layer;

wherein the second optical element and at least part of the support structure are positioned between the first and second membrane layers.

The optical displacement sensor may comprise a proof mass in order to provide an accelerometer (e.g. as described above) but in a set of embodiments the optical displacement sensor comprises an optical microphone.

The optical displacement sensor may comprise a connecting structure positioned between the first and second membrane layers, wherein the connecting structure is attached to (e.g. directly attached to) or integrally formed with each of the first and second membrane layers so that the first and second membrane layers are mechanically coupled to move together. The connecting structure may comprise one or more rigid elements, e.g. one or more pieces of rigid material, e.g. one or more pillars, e.g. a plurality of pillars spaced apart between the membrane layers. It is to be understood that in this context, the connecting structure may be distinct from a proof mass e.g. in an optical microphone it may have insufficient mass to function effectively as a proof mass. The dual-layer membrane and the connecting structure may have a low enough mass that the dual-layer membrane is undeflected or deflected by only a negligible amount due to gravity. The optical displacement sensor may be configured to use closed loop feedback to balance a force on the dual-layer membrane, e.g. due to gravity.

It will be appreciated that the mechanical coupling of the first and second membrane layers means that when one of the membrane layers is subjected to a deflecting force, the force is transmitted to the other membrane layer by the connecting structure, such that both membrane layers move in response to the deflecting force. Accordingly, when an incoming acoustic wave impinges on one side of the dual-layer membrane, the deflecting force exerted by the acoustic wave causes the dual-layer membrane to be deflected relative to the support structure. This causes the first optical element to be displaced relative to the second optical element by an amount that depends on the deflecting force, i.e. on the acoustic wave. The deflection of the dual-layer membrane may be measured in the same manner as described above in relation to the optical accelerometers in accordance with the invention, thus allowing the acoustic wave to be measured.

The optical microphone may be mounted in a microphone housing (e.g. comprising a base and an enclosure) such that a first side of the dual-layer membrane is in fluid communication with an exterior of the microphone housing (e.g. via an acoustic port) and a second side of the dual-layer membrane is in fluid communication with an acoustic cavity (known in the art as a “back volume”) that is acoustically isolated from the exterior of the microphone housing. The first side of the dual-layer membrane may be an outward-facing surface of the first membrane layer and the second side of the dual-layer membrane may be an outward-facing surface of the second membrane layer, or vice versa.

The optical displacement sensor may comprise “interlaced fingers” as defined above in respect of the first and second aspects of the invention.

In a set of embodiments of the optical displacement sensor, the first optical element comprises a first plurality of elongate reflective surfaces and a first plurality of elongate openings arranged alternately with the first plurality of elongate reflective surfaces to form a first diffractive structure in a first plane; and the second optical element comprises a second plurality of elongate reflective surfaces and a second plurality of elongate openings arranged alternately with the second plurality of elongate reflective surfaces to form a second diffractive structure in a second plane; wherein the first and second planes are co-planar either when the dual-layer membrane is in an equilibrium position or when the dual-layer membrane is in a deflected position; and wherein when the first and second planes are co-planar, the first plurality of elongate reflective surfaces are positioned in the second plurality of elongate openings.

The support structure may comprise one or more protruding portions, e.g. a plurality of protruding walls, wherein each elongate reflective surface of the second plurality of elongate reflective surfaces is provided on or comprises a respective distal surface of the protruding portion(s) e.g. of a respective one of said walls. The first membrane layer may comprise one or more protruding portions, e.g. a plurality of protruding walls, wherein each elongate reflective surface of the first plurality of elongate reflective surfaces is provided on or comprises a respective distal surface of the protruding portion(s) e.g. of a respective one of said walls. The support structure may have formed therein (e.g. etched therein) the second plurality of elongate openings, wherein the second plurality of elongate reflective surfaces is provided on or comprises material of the support structure between said elongate openings.

The optical displacement sensor may comprise a volume between the first and second membrane layers that is fully enclosed, e.g. hermetically sealed, e.g. by means of a sealing peripheral mount that supports the membrane layers. The volume between the membrane layers may be at a lower pressure (e.g. at least 10 times lower) than the ambient pressure of the region immediately outside of the volume between the membrane layers. For example, the volume between the membrane layers may comprise an effective vacuum. Providing the volume between the membrane layers at a lower pressure or vacuum may be advantageous in reducing squeeze film effects as the dual-membrane moves relative to the support structure. This may be particularly advantageous in some embodiments comprising interlaced fingers at discussed above, especially in embodiments comprising a plurality of protruding walls, as squeeze film effects may otherwise be significant in such arrangements.

Optional features of the first aspect and/or second aspect may, where applicable, also be features of the third aspect, and vice versa.

BRIEF DESCRIPTION OF THE DRAWINGS

Certain preferred embodiments will now be described, by way of example only, with reference to the accompanying drawings, in which:

FIG. 11 shows a tenth embodiment of an optical accelerometer in accordance with the present invention;

DETAILED DESCRIPTION OF THE DRAWINGS

Figure 1:
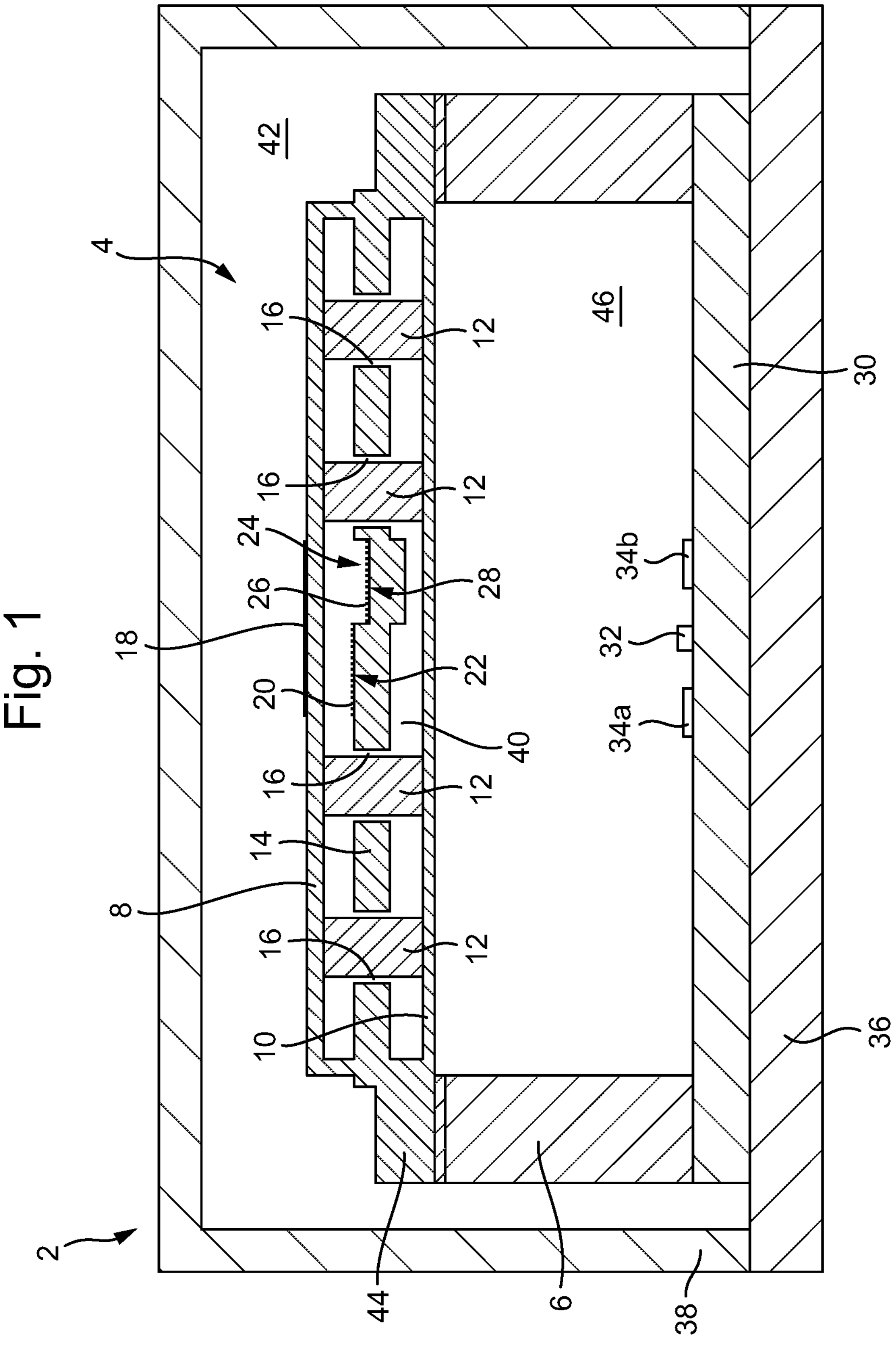
FIG. 1 shows an optical accelerometer comprising a dual-layer membrane in accordance with a first embodiment of the invention.

FIG. 1 shows an optical accelerometer 2 in accordance with a first embodiment of the invention. The optical accelerometer 2 comprises a dual-layer membrane 4, which is supported at its periphery by a silicon support 6. The dual-layer membrane 4 comprises an upper membrane layer 8 and a lower membrane layer 10, and four proof masses 12. The proof masses 12 are positioned between and attached to the upper and lower membrane layers 8, 10.

The optical accelerometer 2 also comprises a support structure 14 which is positioned between the upper and lower membrane layers 8, 10, and which comprises four holes 16 in which the proof masses 12 are positioned. The support structure 14 is fixed to and static relative to the silicon support 6 (i.e. it does not move or moves a negligible amount relative to the silicon support 6, e.g. when the optical accelerometer 2 is subject to an acceleration).

As the proof masses 12 are attached to the upper and lower membrane layers 8, 10, the upper and lower membrane layers 8, 10 are mechanically coupled to move together with the proof masses 12. This means that when the proof masses 12 move, they move together in unison with the upper and lower membrane layers 8, 10 (i.e. the dual-layer membrane 4 as a whole is deflected). The dual-layer membrane 4 is deflected relative to the support structure 14 when the proof masses 12 are subject to a gravitational force or when the optical accelerometer 2 is subject to an acceleration (owing to the inertia of the proof masses 12). When the dual-layer membrane 4 is deflected, the proof masses 12 move within the holes 16 in the support structure 14.

The upper membrane layer 8 has a reflective coating 18 deposited thereon and the support structure 14 has a first diffraction grating 20 (in the form of a plurality of reflective grating lines) deposited thereon. In this embodiment, the upper membrane layer 8 corresponds to the "first membrane layer" discussed above and the lower membrane layer 10 corresponds to the "second membrane layer" discussed above. The reflective coating 18 corresponds to the "first optical element" discussed above and the first diffraction grating 20 corresponds to the "second optical element" discussed above. The first diffraction grating 20 and the reflective coating 18 together form a first interferometric arrangement 22. In this example, a recess 24 is provided in the support structure 14 and a second diffraction grating 26 is deposited on a surface of the support structure 14 in the recess 24. The second diffraction grating 26 and the reflective coating 18 together form a second interferometric arrangement 28, which has a different working point from the first interferometric arrangement 22 to increase the dynamic range of the optical accelerometer 2.

The silicon support 6 is mounted on a readout chip 30, which comprises a vertical-cavity surface-emitting laser (VCSEL) 32 and first and second photo detectors 34*a*, 34*b*, together with suitable circuitry (not shown) for the readout of the optical accelerometer 2. The VCSEL 32 is positioned to emit light (shown in FIGS. 2A to 2C) towards the first and second interferometric arrangements 22, 28 and the photo detectors 34*a*, 34*b* are positioned to detect an interference pattern generated by the light after it has passed through the interferometric arrangements 22, 28, as described further below with reference to FIGS. 2A to 2C.

The readout chip 30 is mounted on a base 36. Over the base 36 is an enclosure 38 which, together with the base 36, encloses the dual-layer membrane 4, the support structure 14 and the silicon support 6. The enclosure 38 and base 36 together help to isolate the dual-layer membrane 4 from external pressure waves (e.g. acoustic waves) that might otherwise cause the dual-layer membrane 4 to move, introducing noise that might impede the determination of the force or acceleration acting on the optical accelerometer 2. The enclosure 38 may also help to protect the dual-layer membrane 4 and the other enclosed components from damage.

In this embodiment, the upper and lower membrane layers 8, 10 together with a peripheral portion 44 of the support structure enclose a volume 40 which is a vacuum. This helps to reduce squeeze film effects between the upper and lower membrane layers 8, 10 and the support structure 14 as the dual-layer membrane 4 moves. In other embodiments (see e.g. FIG. 4) and variations on this embodiment, there may be holes in the upper membrane layer 8 allowing fluid communication between the volume 40 between the upper and lower membrane layers 8, 10 and the volume 42 enclosed by the enclosure 38. The volume 42 inside the enclosure 38 may be a vacuum. When there are holes in the upper membrane layer 8 this means that the volume between the upper and lower membrane layers 8, 10 is also a vacuum, which may provide the benefits of reduced squeeze film effects. More generally, providing a vacuum in the volume 42 inside the enclosure 38 may further help to isolate the optical accelerometer 2 from external pressure waves.

The silicon support 6 may be mounted or shaped to allow fluid communication between a volume 46 that is between the lower membrane layer 10 and the readout chip 30 and the rest of the volume 42 enclosed by the enclosure 38.

As discussed above, the provision of the support structure 14 and the second optical element 20 between the upper and lower membrane layers 8, 10 may allow the use of surface micromachining to manufacture at least the dual-layer membrane 4, wherein the dual-layer membrane 4 may be provided with a large gap between the membrane layers 8, 10 to support large proof masses 12.

Figure 2A:
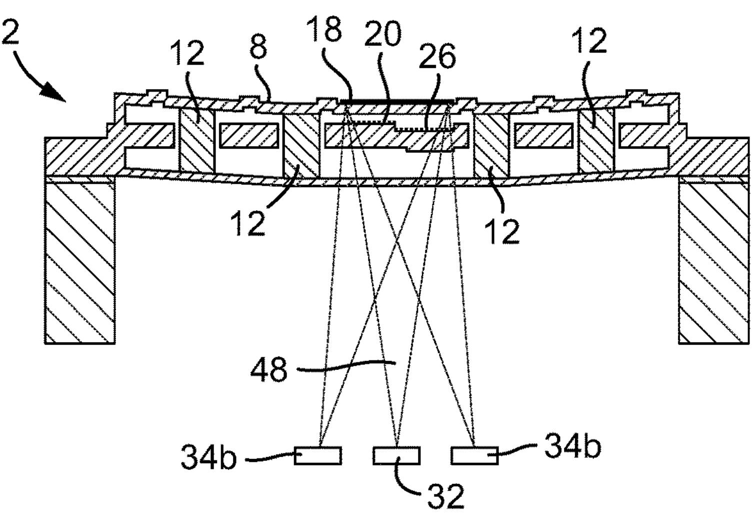
FIGS. 2A to 2C show schematic representations illustrating the operation of the optical accelerometer of FIG. 1.
Figure 2B:
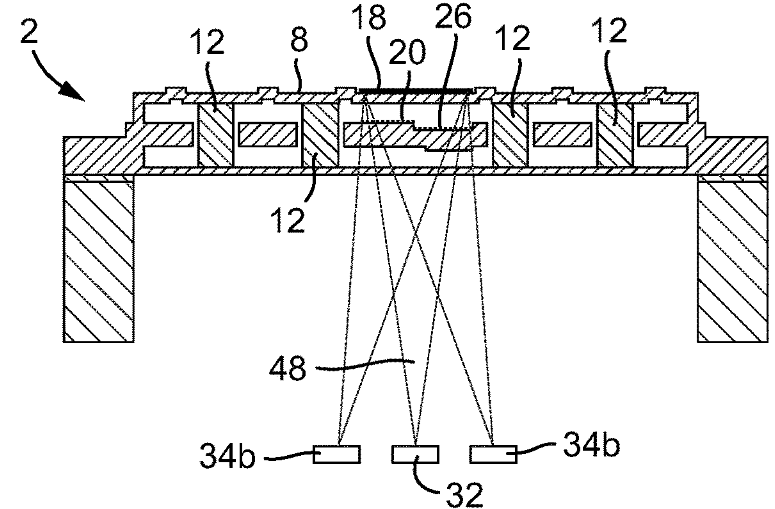
Figure 2C:
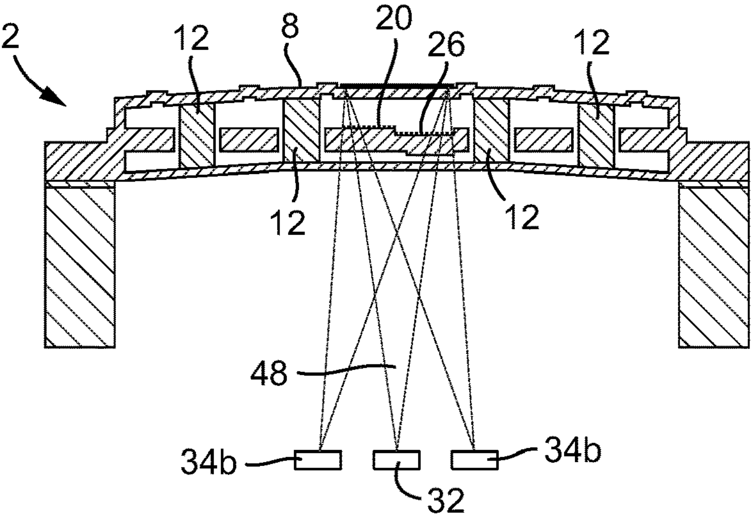

FIGS. 2A to 2C show schematically the operation of the optical accelerometer 2 of FIG. 1 to illustrate the readout technique. Each of FIGS. 2A to 2C show the optical accelerometer 2 of FIG. 1, but the readout chip, the base and the enclosure are omitted from these Figures for clarity.

When the optical accelerometer 2 is operating, the VCSEL 32 emits light 48, which is directed onto the first and second diffraction gratings 20, 26. Of the light that impinges on the first diffraction grating 20, a first portion passes through the first diffraction grating 20 and is diffracted. This diffracted light propagates through the upper membrane layer 8 to the reflective coating 18, which reflects the diffracted light back through the upper membrane layer 8 onto the first photo detector 34*a* via the first diffraction grating 20. A second portion is reflected by the first diffraction grating 20 onto the first photo detector 34*a*. The second portion interferes with the first portion to form an interference pattern, and consequently the intensity of light detected at the first photo detector 34*a* depends on the interference pattern, and therefore on the distance between the first grating 8 and the reflective coating 18 on the upper membrane layer 8.

Similarly, of the light that impinges on the second diffraction grating 26, a first portion passes through the second diffraction grating 26 and is diffracted. This diffracted light is then reflected by the reflective coating 18 on the upper membrane layer 8 onto the second photo detector 34*b* via the second diffraction grating 26. A second portion is reflected by the second diffraction grating 26 onto the second photo detector 34*b*. The second portion interferes with the first portion to form an interference pattern, and consequently the intensity of light detected at the photo detector 34*b* depends on the interference pattern, and therefore on the distance between the second grating 26 and the reflective coating 18 on the upper membrane layer 8.

As the intensity of the light at each of the photo detectors 34*a*, 34*b* depends on the distance between the respective diffraction grating 20, 26 and the reflective coating 18 on the upper membrane layer 8, the position of the first reflective coating 18 (which depends on the position of the proof masses 12, which are mechanically coupled to the upper membrane layer 8 and therefore the reflective coating 18) can be inferred from the detected intensities. Measuring the light intensities and determining the position of the reflective coating 18 as a function of time allows the determination of the motion (and in particular the acceleration) of the reflective coating 18, allowing the force acting on the proof masses 12 or the acceleration to which the optical accelerometer 2 is subject to be determined. A calibration process may be used to relate values obtained via the optical readout (e.g. variation in light intensity or determined acceleration values) to an acceleration of the optical accelerometer 2 or a force acting on the proof masses 12.

FIGS. 3 to 11 show further embodiments of optical accelerometers in accordance with the present invention. FIGS. 3 to 11 omit the readout chip, the base and the enclosure for clarity. For features that are the same as in an embodiment of another Figure, the same reference numerals are used.

Figure 3:
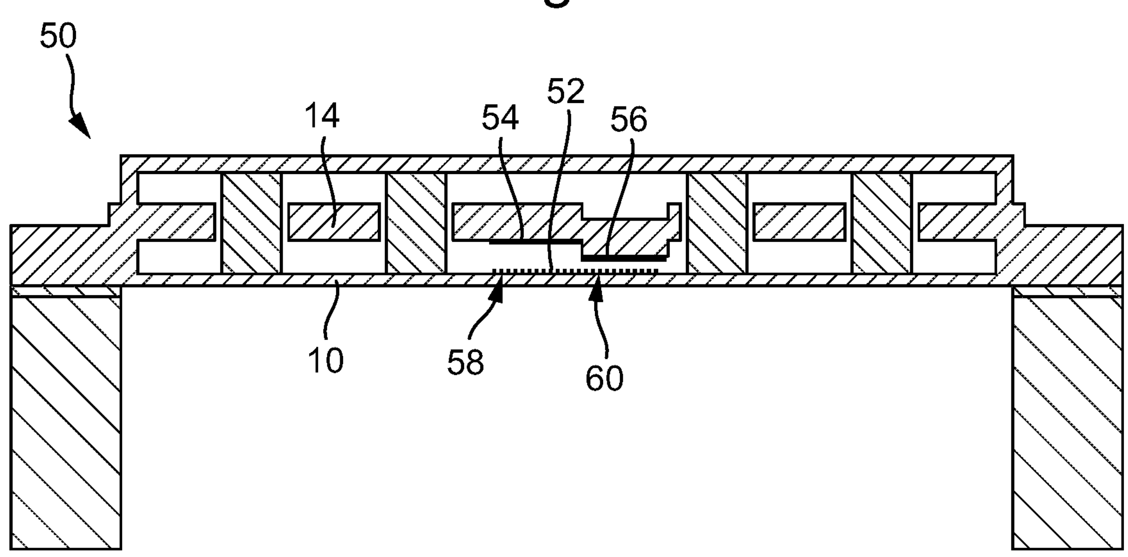
FIG. 3 shows a second embodiment of an optical accelerometer in accordance with the present invention.

FIG. 3 shows a second embodiment of an optical accelerometer 50 in accordance with the present invention. The optical accelerometer 50 is the same that the optical accelerometer 2 of FIG. 1, except for the arrangement of the optical elements.

In the optical accelerometer 50 of FIG. 3, a diffraction grating 52 is provided on the lower membrane layer 10 and first and second reflective coatings 54, 56 are provided on respective first and second surfaces of the support structure 14. The first and second surfaces are on regions of different heights on the support structure 14, so that the first reflective coating 54 and the diffraction grating 52 together form a first interferometric arrangement 58 and the second reflective coating 56 and the diffraction grating 52 together form a second interferometric arrangement 60, which has a different working point from the first interferometric arrangement 58.

Figure 4:
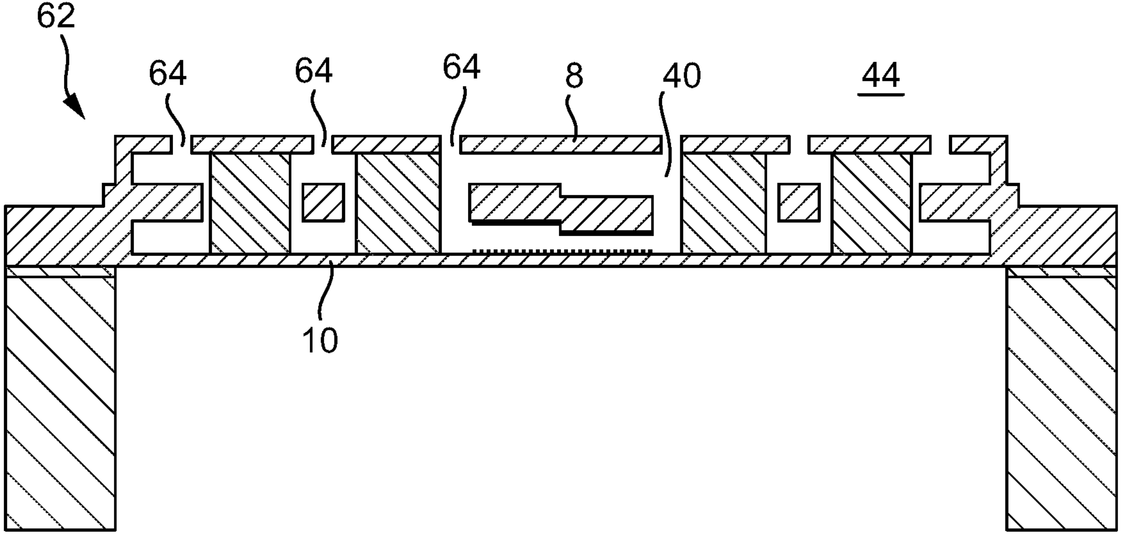
FIG. 4 shows a third embodiment of an optical accelerometer in accordance with the present invention.

FIG. 4 shows a third embodiment of an optical accelerometer 62 in accordance with the present invention. The optical accelerometer is the same as the optical accelerometer 50 of FIG. 3, except that holes 64 are provided in the upper membrane layer 8. The holes 64 allow fluid communication between the volume 40 between the upper and lower membrane layers 8, 10 and the volume 44 exterior to the dual-layer membrane. As discussed above with reference to FIG. 1, if the optical accelerometer 62 is enclosed by a base and an enclosure, both the enclosed volume 44 and the volume 40 between the membrane layers may be at a low pressure, e.g. vacuum, helping to reduce squeeze film effects.

Figure 5:
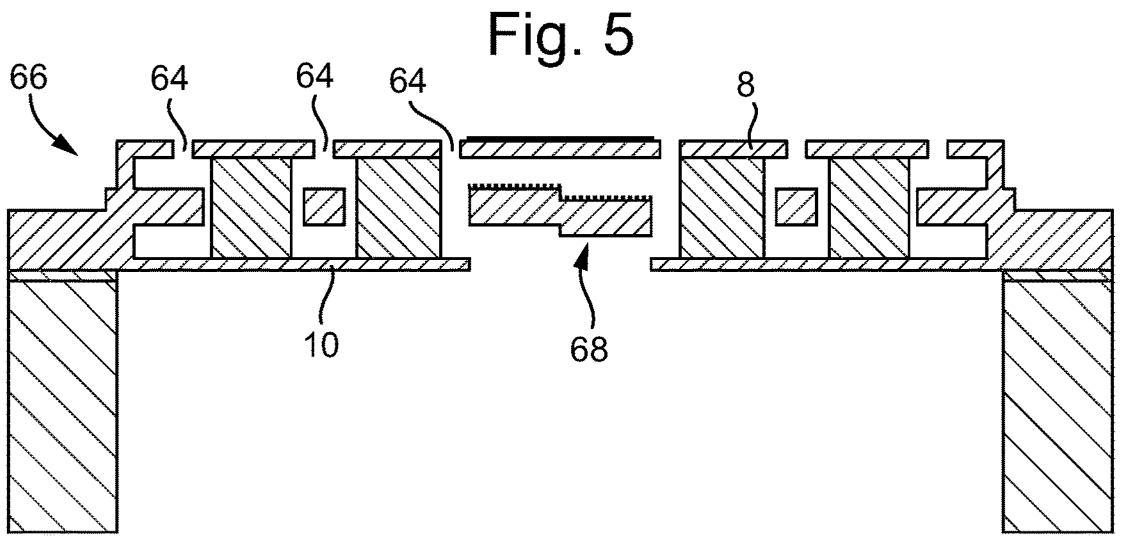
FIG. 5 shows a fourth embodiment of an optical accelerometer in accordance with the present invention.

FIG. 5 shows a fourth embodiment of an optical accelerometer 66 in accordance with the present invention. The optical accelerometer 66 is the same as the optical accelerometer 2 of FIG. 1, except that (like in the embodiment of FIG. 3) holes 64 are provided in the upper membrane layer 8, and additionally an aperture 68 is provided in the lower membrane layer 10. The aperture 68 is positioned to allow light to propagate from the VCSEL to the interferometric arrangements and then to the photo detectors without passing through the material of the lower membrane layer 10. This may help to improve the operation of the optical accelerometer 66 by removing the impact of losses in light intensity resulting from reflection from or absorption by the material of the lower membrane layer 10.

Figure 6:
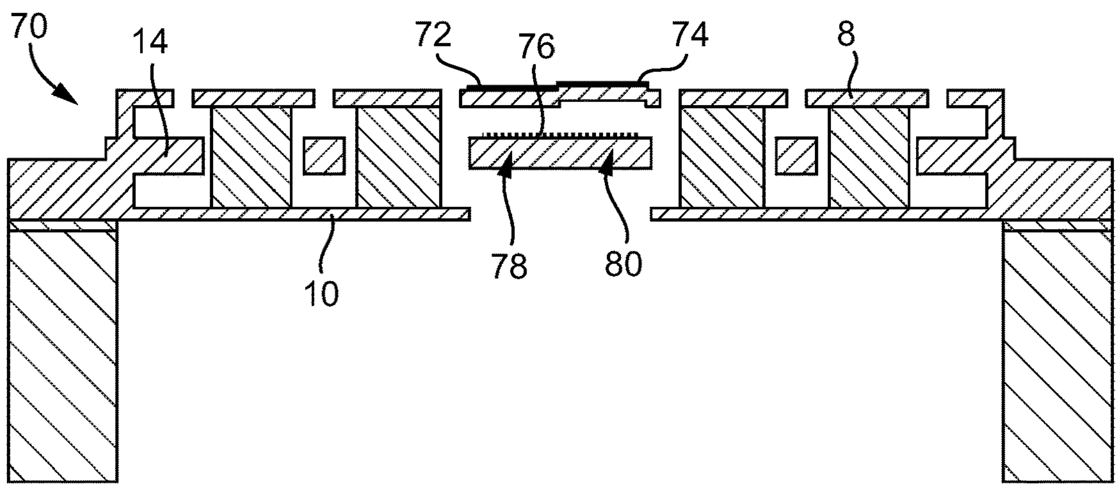
FIG. 6 shows a fifth embodiment of an optical accelerometer in accordance with the present invention.

FIG. 6 shows a fifth embodiment of an optical accelerometer 70 in accordance with the present invention. The optical accelerometer 70 is the same as the optical accelerometer 66 of FIG. 5, except that regions of different height are provided in the upper membrane layer 8 instead of in the support structure 14. Respective reflective coatings 72, 74 are provided on the regions of different height, which together with a diffraction grating 76 on provided on a surface of the support structure 14, form respective interferometric arrangements 78, 80 that are used with the readout technique as described above.

Figure 7:
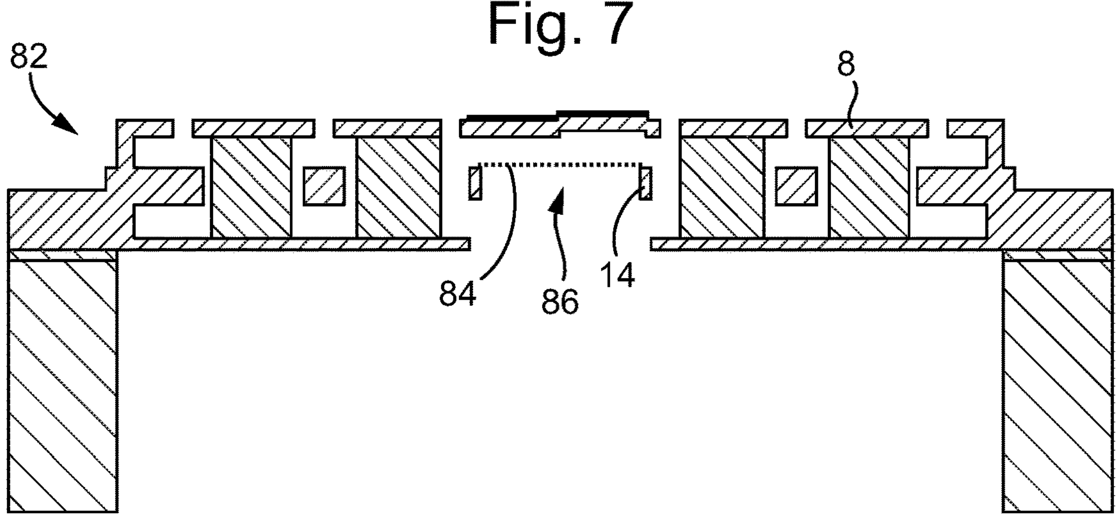
FIG. 7 shows a sixth embodiment of an optical accelerometer in accordance with the present invention.

FIG. 7 shows a sixth embodiment of an optical accelerometer 82 in accordance with the present invention. The optical accelerometer 82 is the same that the optical accelerometer 70 of FIG. 6, except that instead of the diffraction grating being provided on a surface of the support structure 14, the diffraction grating is formed as freestanding grating lines 84 (e.g. a plurality of grating lines separated by elongate holes) suspended over an aperture 86 in the support structure.

Figure 8:
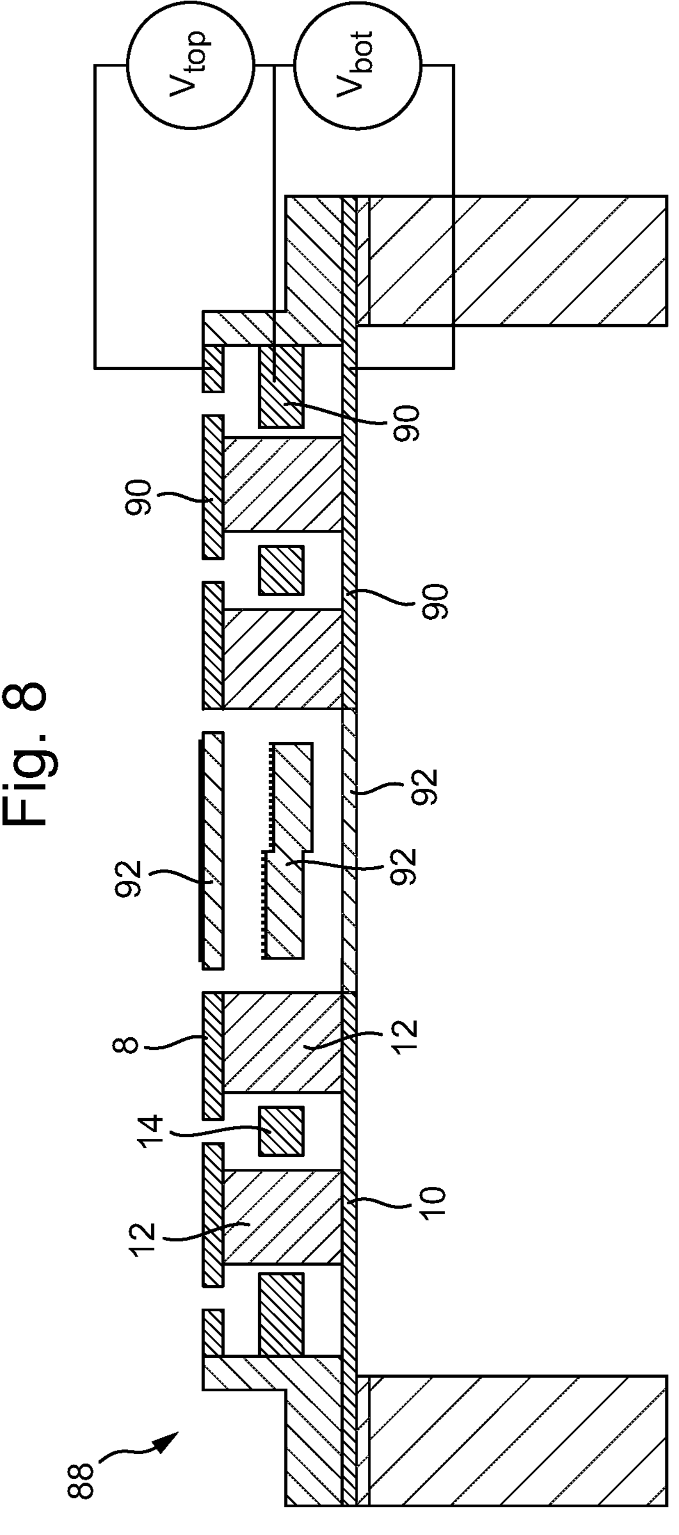
FIG. 8 shows a seventh embodiment of an optical accelerometer in accordance with the present invention, incorporating closed loop feedback.

FIG. 8 shows a seventh embodiment of an optical accelerometer 88 in accordance with the present invention, incorporating closed loop feedback. The optical accelerometer is similar to the other embodiments described above and comprises similar features. Closed loop feedback can be used with other embodiments comprises other combinations of features and is not limited to use with the particular combination of features shown in FIG. 8.

This embodiment differs from the other embodiments described above in that part of each of the upper membrane layer 8, the lower membrane layer 10 and the support structure 14 are made from a conductive material 90. Central regions of each of the upper membrane layer, the lower membrane layer and the support structure are made from a different material 92 that is transparent to the light emitted by the VCSEL, so that the light can still propagate via the interferometric arrangements.

A voltage $V_{top}$ is applied between the respective conductive parts of the upper membrane layer 8 and the support structure 14. A voltage $V_{bot}$ is applied between the respective conductive parts of the lower membrane layer 10 and the support structure 14. The readout technique described above is used to detect either an offset resulting from the force of gravity acting on the proof masses 12 or to determine the magnitude of a resonance in the accelerometer response, and the voltages $V_{top}$ and $V_{bot}$ are adjusted accordingly to compensate for the offset or the resonance (e.g. balancing the force due to gravity or damping the resonance).

Figure 9:
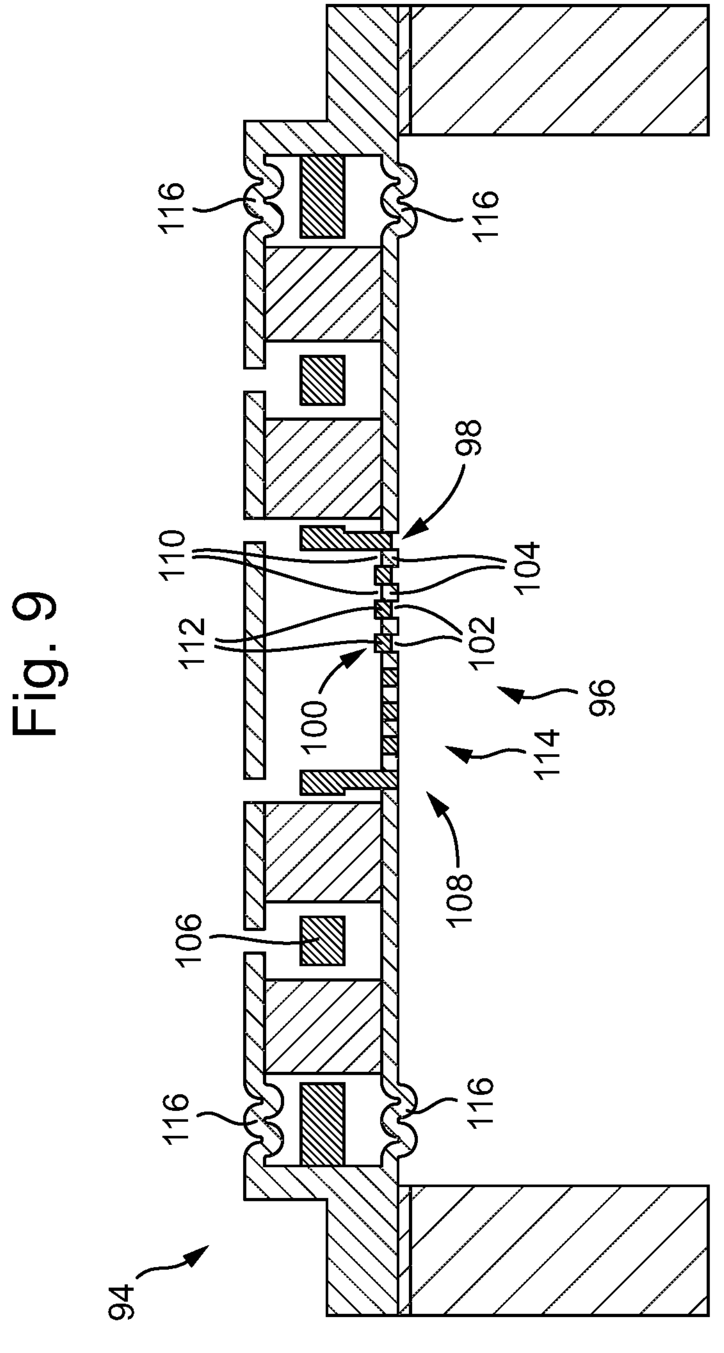
FIG. 9 shows an eighth embodiment of an optical accelerometer in accordance with the present invention, comprising an interferometric arrangement that comprises diffractive structures formed as interlaced fingers.

FIG. 9 shows an eighth embodiment of an optical accelerometer 94 in accordance with the present invention, comprising an interferometric arrangement 96 that comprises diffractive structures formed as interlaced fingers.

The optical accelerometer 94 is similar to the optical accelerometer 62 of FIG. 4, but differs in two respects. The first difference concerns the structure of the first and second optical elements 98, 100 and how they form the interferometric arrangement 96. In this embodiment, the lower membrane layer 10 comprises a plurality of elongate openings 102 etched therethrough, so that between the openings 102, the remaining material of the lower membrane layer 10 has the form of fingers 104 (i.e. elongate structures), each providing an elongate reflective surface facing the lower membrane layer 10.

The optical accelerometer 94 has a support structure 106 that is shaped to have a thin portion 108 with a plurality of elongate openings 110 etched therethrough, so that between the openings 110, the remaining material of the thin portion 108 of the support structure 106 has the form of fingers 112, each providing an elongate reflective surface facing the lower membrane layer 10.

In this embodiment and the embodiment of FIG. 10 described below, the term “elongate” means elongate in the direction of the plane of the thinned portion 108 of the support structure 106 or in the plane of the lower membrane layer 10.

The support structure 106 is also shaped so that the thinned portion 108 comprising the fingers 112 is supported out of the plane of the rest of the support structure 106 and in the plane of the lower membrane layer 10 when the lower membrane layer 10 is undeflected or deflected by a only small amount. The openings 102 in the lower membrane layer 10 are aligned with the fingers 112 of the support structure 106 such that when the lower membrane layer 10 is undeflected or deflected by only a small amount, the fingers 112 of the support structure 106 are positioned in the openings 102 in the lower membrane layer 10, and the fingers 104 of the lower membrane layer 10 are positioned in the openings 110 of the support structure 106, so that the two sets of fingers 104, 112 are interlaced. The fingers 112 of the support structure 106 together with the fingers 104 of the lower membrane layer 10 then have a combined structure that functions effectively as a single reflective surface.

When the dual-layer membrane is deflected, the fingers 104 of the lower membrane layer 10 move in, through and out of the openings 110 in the support structure 106 as the lower membrane layer 10 moves in and out of the plane of the thinned portion 108 of the support structure 106. When the two sets of fingers 104, 112 are not in the same plane, each forms a diffractive element, and the diffractive elements together form an interferometric arrangement 96 with a variable spacing.

In this example, a region of the thinned portion 108 of the support structure is recessed to provide two interferometric arrangements 906, 114 with different working point (although this feature is not essential in this embodiment or in other embodiments).

In a similar manner to that discussed above in the context of FIGS. 2A to 2C, an interference pattern is formed at the photo detector (not shown) which depends on the separation between the two sets of fingers 104, 112, allowing the force on, or acceleration of, the optical accelerometer 94 to be determined.

The second difference is that in this embodiment, corrugations 116 are provided at the periphery of each of the upper and lower membrane layers 8, 10. The corrugations reduce the in-plane tension in the membrane layers 8, 10, increasing the membrane compliance and improving the sensitivity of the optical accelerometer 94. It is not essential to provide the corrugations in combination with the feature of the interlaced fingers. The corrugations may be omitted from this embodiment and corrugations may be provided in other embodiments with or without the feature of the interlaced fingers.

Figure 10:
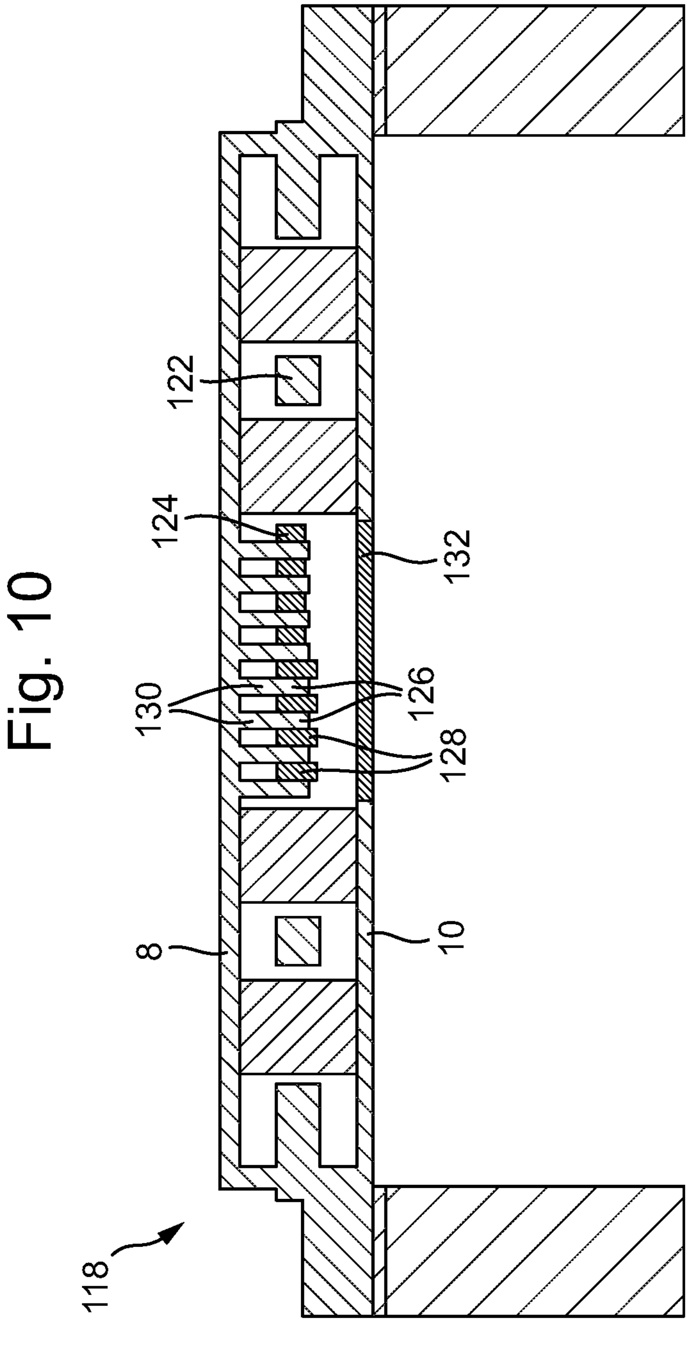
FIG. 10 shows a ninth embodiment of an optical accelerometer in accordance with the present invention, comprising an alternative interferometric arrangement that comprises diffractive structures formed as interlaced fingers.

FIG. 10 shows a ninth embodiment of an optical accelerometer 118 in accordance with the present invention, comprising an alternative interferometric arrangement 120 that comprises diffractive structures formed as interlaced fingers.

The interferometric arrangement 120 of this embodiment functions in a similar manner to the embodiment of FIG. 9, but has a different structure. In this embodiment, the support structure 122 does not have a thin portion shaped to lie in the plane of one of the membrane layers 8, 10. Instead, a central region 124 of the support structure 122 has deep openings 126 extending therethrough. The openings 126 are elongate in the direction of a plane of the support structure 122, so that the remaining material between the openings form fingers 128, each having a reflective surface facing the lower membrane layer 10.

The upper membrane layer 8 comprises a plurality of elongate walls 130 protruding towards and through the elongate openings 126 in the support structure 122. A surface of each of the walls 130 facing the lower membrane layer 10 is a reflective surface.

As the dual-layer membrane is deflected, the walls 130 move within the openings 126, so that the reflective surfaces on the walls 130 move in and out of the plane of the reflective surfaces on the support structure 122, functioning as an interferometric arrangement 120 with a variable spacing in a similar manner to that described above with reference to FIG. 9, allowing a force on, or acceleration of, the optical accelerometer 118 to be determined in a similar manner using the optical readout techniques previously described.

In this embodiment, there are no holes in the membrane layers 8, 10 and the volume 40 between the membrane layers 8, 10 is a vacuum. This helps to mitigate squeeze film effects that may otherwise result from the shape and interaction of the walls 130 and fingers 128.

In this embodiment, the lower membrane layer comprises a region 132 with greater transparency, e.g. formed from a dielectric film or stack, to help light from the light source (not shown) to propagate through the lower membrane layer 10 to the interferometric arrangement 120.

Figure 11:
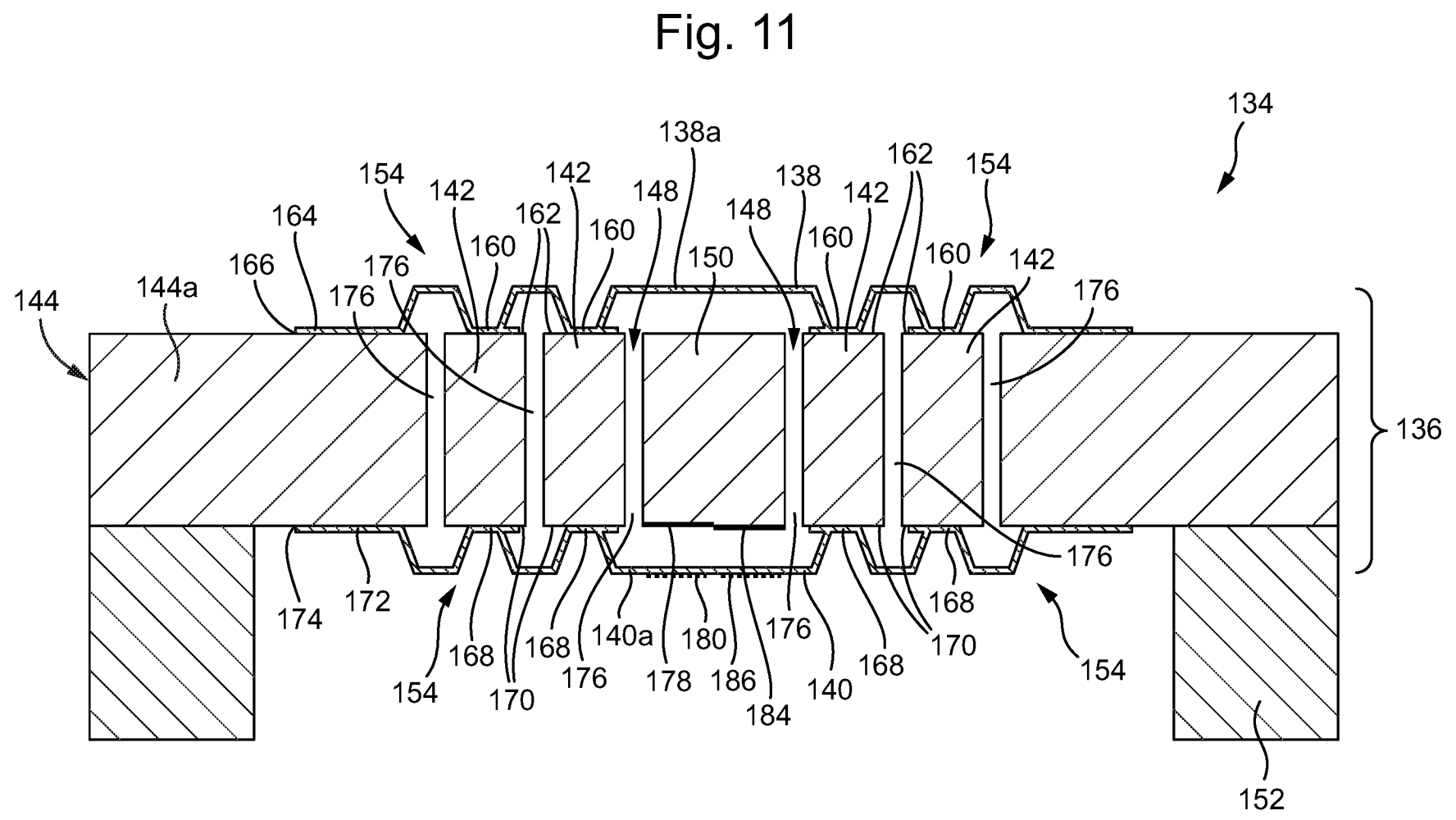

FIG. 11 shows a tenth embodiment of an optical accelerometer 134 in accordance with the present invention. The optical accelerometer 134 comprises a dual-layer membrane 136, which comprises an upper membrane layer 138 and a lower membrane layer 140, and four proof masses 142. The proof masses 142 are positioned between and attached to the upper and lower membrane layers 138, 140. The optical accelerometer 134 also comprises a support structure 144.

The optical accelerometer 134 of this embodiment differs from the embodiments described above in that the support structure 144 and the proof masses 142 are formed out of the same wafer, and also in that the upper and lower membrane layers 138, 140 are shaped to be attached to the proof masses 142 and to a peripheral region 144*a* of the support structure 144, as described in more detail below.

The support structure 144 comprises two holes 148 in which the proof masses 142 are positioned. The support structure 144 also comprises a central portion 150 which is positioned between the upper and lower membrane layers 138, 140. The support structure 144 also comprises a peripheral region 144*a*. The upper and lower membrane layers 138, 140 are attached to and supported by the peripheral region 144*a* of the support structure 144. The support structure 144 is supported at the peripheral region 144*a* by a support 152. The support 152 may, for example, be part of a packaging that houses the optical accelerometer 134. The support structure 144 is fixed to and static relative to the support 152 (i.e. it does not move or moves a negligible amount relative to the support 152, e.g. when the optical accelerometer 134 is subject to an acceleration). The central portion 150 is integrally formed with the rest of the support structure 144 and is also static relative to the support 152.

As can be seen from FIG. 11, the upper and lower membrane layers 138, 140 each comprise undulating regions 154 and a central flat region 138*a*, 140*a*. A lower part 160 of each undulation in the upper membrane layer 138 is attached to an upper surface 162 of one of the proof masses 142. At a periphery 164 of the upper membrane layer 138, the upper membrane layer 138 is attached to an upper peripheral surface 166 of the support structure 144. The central flat region 138*a* of the upper membrane layer 138 is positioned above and spaced from the central portion 150 of the support structure 144.

An upper part 168 of each undulation in the lower membrane layer 140 is attached to a lower surface 170 of one of the proof masses 142. At a periphery 172 of the lower membrane layer 140, the lower membrane layer 140 is attached to a lower peripheral surface 174 of the support structure 144. The central flat region 140*a* of the lower membrane layer 140 is positioned below and spaced from the central portion 150 of the support structure 144.

The proof masses 142 and the support structure 144 are made from the same wafer by etching gaps 176 into the wafer to separate the proof masses 142 from the rest of the wafer, which forms the support structure 144. The proof masses 142 are therefore only attached to the upper and lower membrane layers 138, 140 and not directly to the support structure 144, so the proof masses 142 can move together with the upper and lower membrane layers 138, 140 relative to the support structure 144 when the proof masses 142 are subject to an acceleration.

A reflective surface 178 is formed on a lower surface of the central portion 150 of the support structure 144 and a diffraction grating 180 is formed in a corresponding position on the central flat region 140*a* of the lower membrane layer 140. The reflective surface 178 and the diffraction grating 180 together form an interferometric arrangement. A second reflective surface 184 and a corresponding diffraction grating 186 are provided to form a second interferometric arrangement with a different working point.

When the dual-layer membrane 136 is deflected by an acceleration, the diffraction gratings 180, 186 move relative to the reflective surfaces 178, 184. The displacement of the diffraction gratings 180, 186 relative to the reflective surfaces 178, 184 (and thus the acceleration) is measured in the same way as described above with reference to FIGS. 2A-2C.

Figure 12B:
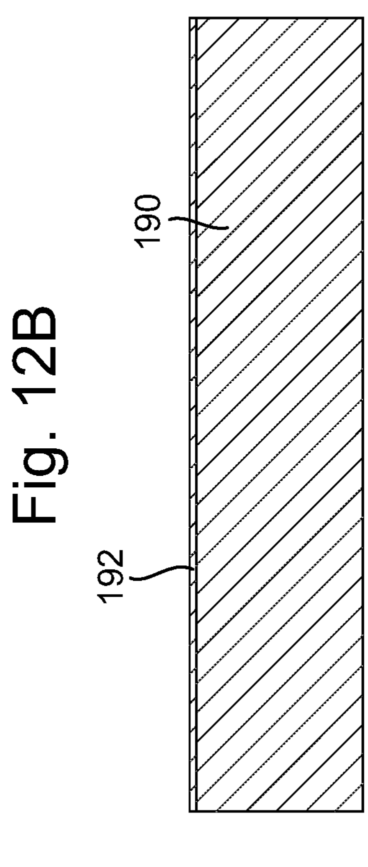
FIGS. 12A to 12R show successive stages in a method of manufacture for producing a dual-layer membrane for use in optical accelerometers in accordance with the present invention.
Figure 12D:
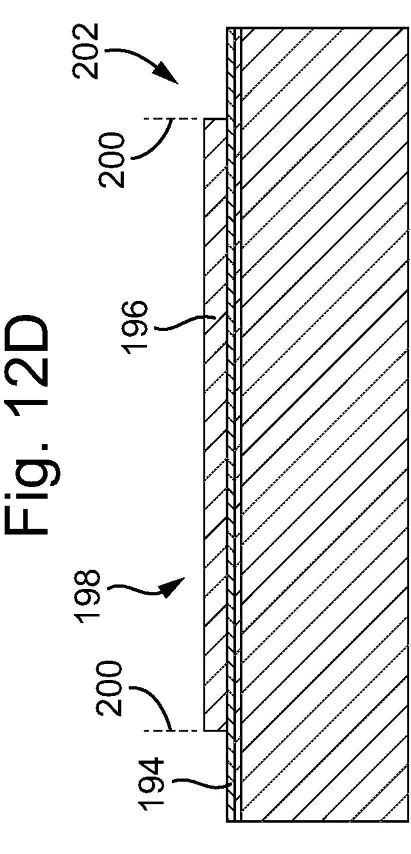
Figure 12A:
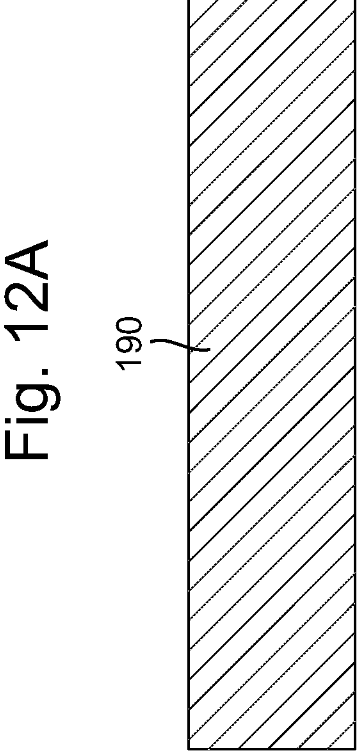

FIGS. 12A to 12R show successive stages in an example method of manufacture in accordance with the present invention for producing a dual-layer membrane for use in optical accelerometers.

Figure 12C:
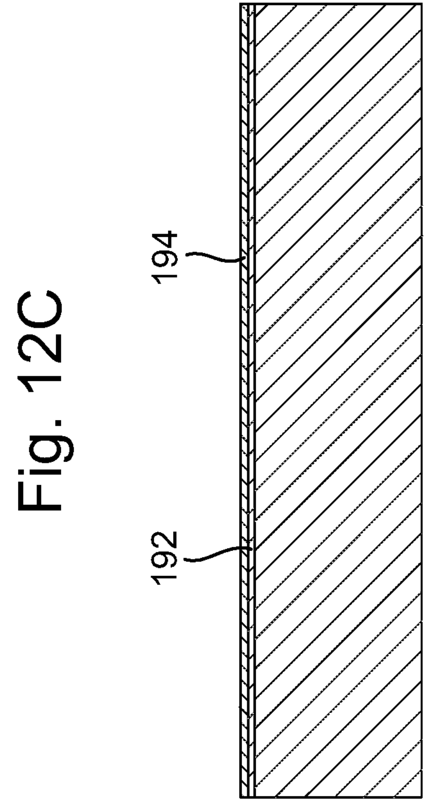

FIG. 12A shows a silicon wafer 190 that is used as a substrate for manufacturing the dual-layer membrane. As illustrated in FIG. 12B, an etch stop layer 192 is applied by chemical vapour deposition (CVD) to the top surface of the silicon wafer 190. In this example, the etch stop layer 192 is made from silicon dioxide ($SiO_2$), but any other suitable material may be used instead. As illustrated in FIG. 12C, a bottom membrane layer 194 is applied by CVD on top of the etch stop layer 192.

As illustrated in FIG. 12D, a layer of sacrificial material 196 is applied by CVD on top of the bottom membrane layer 194. The sacrificial material 196 does not completely cover the bottom membrane layer 194. Instead, patterning and etching are used so that the sacrificial material 196 covers an area corresponding to a membrane envelope 198 (whose edges are indicated by the dotted lines 200), leaving a peripheral region 202 of the bottom membrane layer 194 (i.e. outside the membrane envelope 198) exposed. In this example, the sacrificial material 196 is $SiO_2$, although other materials are possible.

Figure 12F:
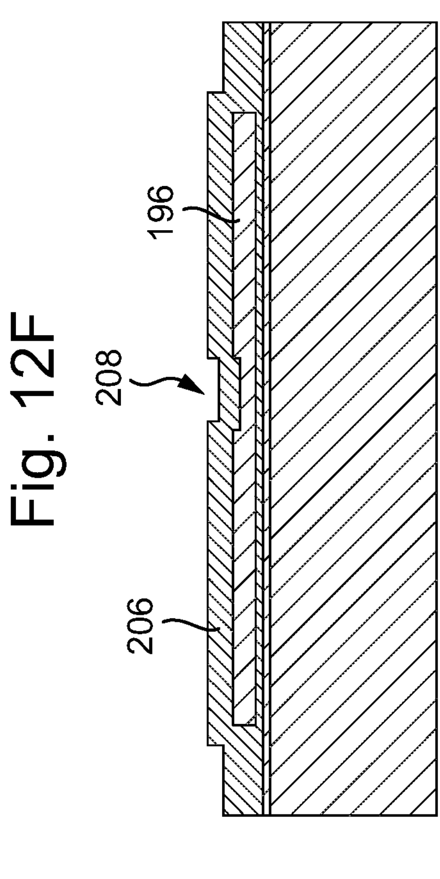
Figure 12H:
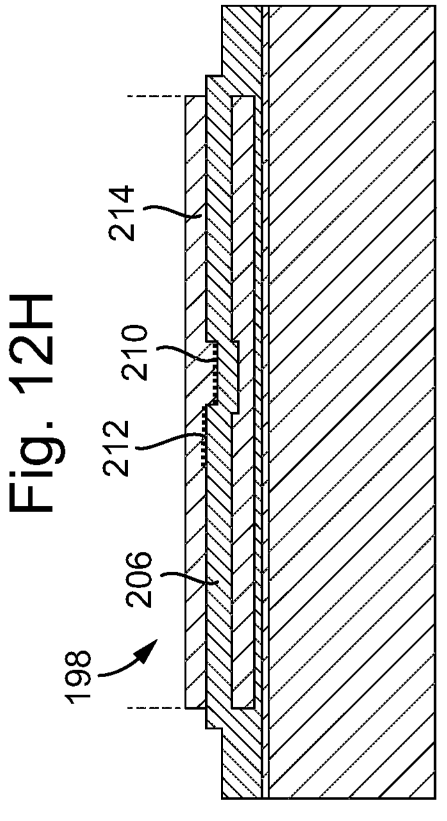
Figure 12E:
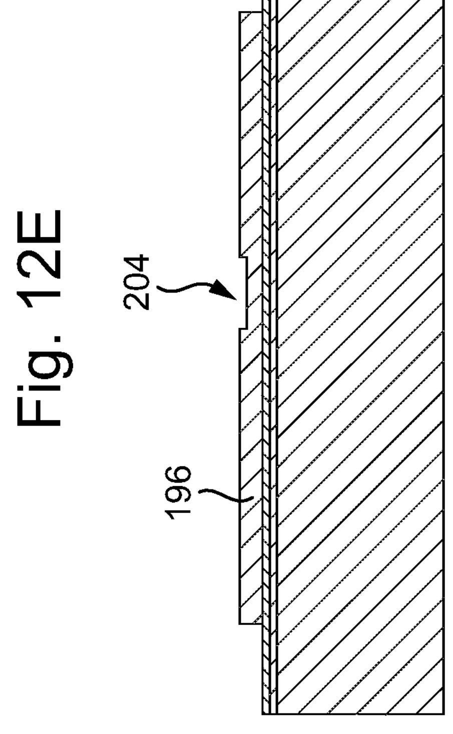

As illustrated in FIG. 12E, a recess 204 is selectively etched in the layer of sacrificial material 196. As illustrated in FIG. 12F, a support structure layer 206 is deposited by CVD over the layer of sacrificial material 196, extending over the periphery of the layer of sacrificial material 196 so that it also covers the exposed region 202 of the bottom membrane layer 194. It can be seen that, owing to the recess 204 in the sacrificial layer 196, a recess 208 is also formed in the support structure layer 206.

Figure 12G:
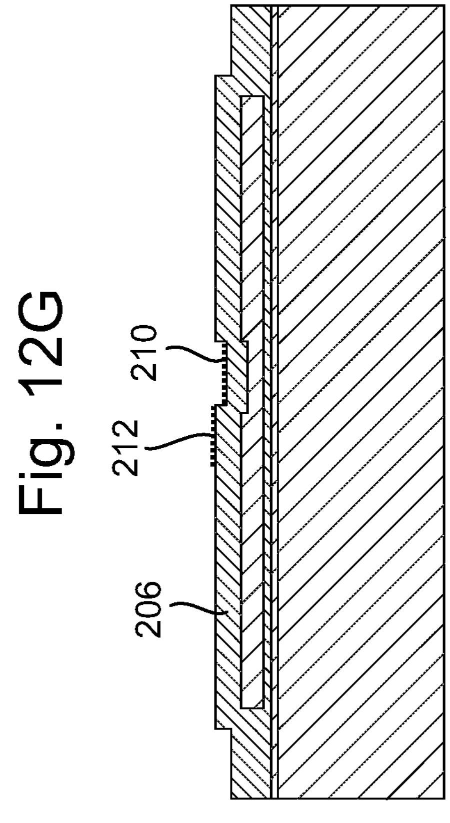

As illustrated in FIG. 12G, first and second diffraction gratings 210, 212 are fabricated on the surface of the support structure layer 206. The first diffraction grating 210 is formed at the bottom of the recess 208, while the second diffraction grating 212 is formed on a surface adjacent to the recess 208 at a different height from the first diffraction grating 210. As illustrated in FIG. 12H, a further layer of sacrificial material 214 is deposited by CVD over the support structure layer 206, covering the region corresponding to the membrane envelope 198, including covering the first and second diffraction gratings 210, 212.

As illustrated in FIG. 12J, four cavities 216 are selectively etched through both layers of sacrificial material 196, 214 and through the support structure layer 206, so that at the bottom of each cavity 216, a corresponding area of the bottom membrane layer 194 is exposed. As illustrated in FIG. 12K, each cavity 216 is filled with a proof mass material 220 (i.e. material suitable for forming a proof mass). In this example, the proof mass material 220 is poly-silicon, although other materials are possible.

As illustrated in FIG. 12L, a top membrane layer 222 is deposited by CVD over the further layer of sacrificial material 214 and the proof mass material 220, extending over the periphery of the further layer of sacrificial material 214 to join with the support structure layer 206 around the periphery of the membrane envelope 198, so that the sacrificial material 196, 214 is completely enclosed. As illustrated in FIG. 12M, a number of small holes 224 are selectively etched into the top membrane layer 222, exposing the sacrificial material 214 underneath.

As illustrated in FIG. 12N, all of the sacrificial material 196, 214 between the top and bottom membrane layers 194, 222 is removed by etching via the small holes 224 in the top membrane layer 222. This leaves a gap 226 between the top and bottom membrane layers 194, 222, and leaves four proof masses 228 formed from the proof mass material extending between and attached to the top and bottom membrane layers 194, 222.

As illustrated in FIG. 12P, the holes 224 in the top membrane layer 222 are plugged. Prior to the plugging of the holes 224, the pressure in the gap 226 between the top and bottom membrane layers 194, 222 is adjusted to vacuum. Once the holes 224 have been plugged, the volume between the top and bottom membrane layers 194, 222 is maintained at vacuum.

As illustrated in FIG. 12Q, a reflective coating 230 is deposited on a region of the top membrane layer 222, positioned over the first and second diffraction gratings 210, 212, so that the first and second diffraction gratings 210, 212 together with the reflective coating form 230 a respective interferometric arrangement 232, 234, each interferometric arrangement 232, 234 having a different working point.

As illustrated in FIG. 12R, the part of the silicon wafer 190 underneath the membrane envelope 198 is then removed by etching. The etch stop layer 192 ensures that the etching only progresses up to the bottom membrane layer 194, without etching through it. This leaves a free-standing dual-layer membrane 236, which is supported at its periphery by a silicon support 238 formed from the remaining portion of the silicon wafer 190. Owing to the flexibility of the top and bottom membrane layers 194, 222, the dual-layer membrane 236 is able to be deflected by a force acting on the proof masses 228.

The dual-layer membrane 236 may then be used in an optical accelerometer, such as described hereinabove. The dual-layer membrane 236 could be mounted in an optical accelerometer using any suitable technique, e.g. wafer bonding, although in some examples, other parts of the optical accelerometer (e.g. a readout portion underneath the dual-layer membrane) may be formed together with the dual-layer membrane as part of the surface micromachining method of manufacture.

In this embodiment, the top and bottom membrane layers 194, 222 and the support structure layer 206 are made from $Si_3N_4$, but other materials are possible and these layers do not have to be formed from the same material. In this embodiment, various layers are described as being applied by chemical vapour deposition (CVD), but other processes for applying the layers are possible in this and other embodiments.

It will be understood that this method is only an example the invention is not limited to this particular example method. For example, in some variations one or more steps may be added, omitted, changed or reordered. For example, the steps relating to creating the support structure layer 206 may be omitted, in line with the disclosure above.

Figure 13:
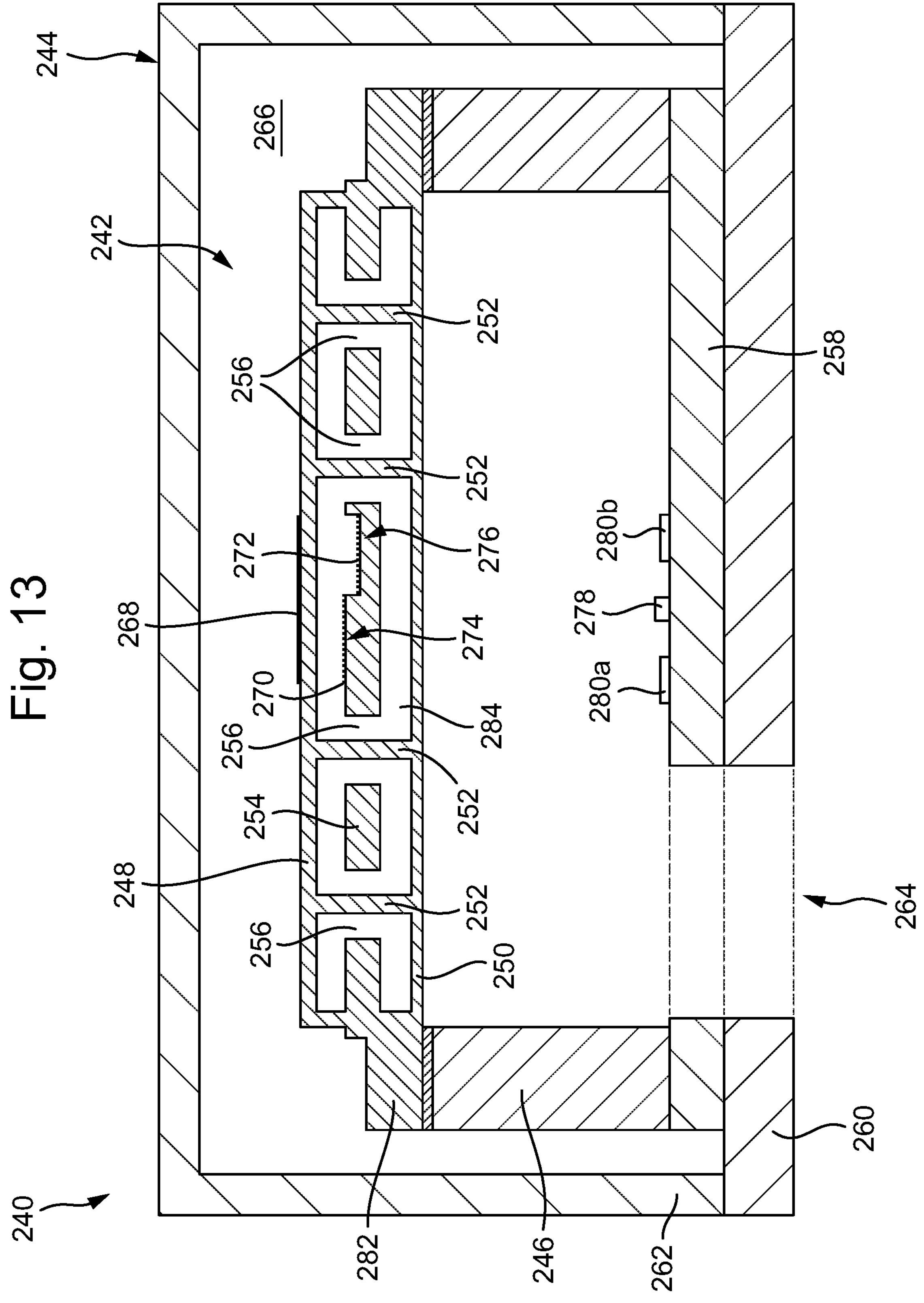
FIG. 13 shows an optical microphone comprising a dual-layer membrane in accordance with an embodiment of the invention.

FIG. 13 shows an optical microphone 240 in accordance with an embodiment of the invention. The optical microphone 240 has a similar structure to the optical accelerometer 2 of FIG. 1, including a dual-layer membrane 242, but it does not comprise any proof masses and the optical microphone 240 is arranged in a microphone housing 244 that is configured so that the dual-layer membrane 242 moves in response to an incoming acoustic wave, as discussed below.

The dual-layer membrane 242 is supported at its periphery by a silicon support 246. The dual-layer membrane 242 comprises an upper membrane layer 248 and a lower membrane layer 250. The upper membrane layer 248 and the lower membrane layer 250 are mechanically coupled by pillars 252 positioned between and attached to the upper and lower membrane layers 248, 250. The pillars 252 differ from the proof masses 12 of FIG. 1 in that they do not add significant extra mass to the dual-layer membrane 242, i.e. such that a gravitational force or acceleration acting on the optical microphone 240 does not cause significant deflection of the dual-layer membrane 242.

The optical microphone 240 also comprises a support structure 254 which is positioned between the upper and lower membrane layers 248, 250, and which comprises four holes 256 in which the pillars 252 are positioned. The support structure 254 is fixed to and static relative to the silicon support 246 (i.e. it does not move or moves a negligible amount relative to the silicon support 246, e.g. when the optical microphone 240 is subject to an incoming acoustic wave).

The silicon support 246 is mounted on a readout chip 258, which is mounted on a base 260. Over the base 260 is an enclosure 262 which, together with the base 260, forms the microphone housing 244. The base 260 and readout chip 258 comprise an acoustic port 264, through which acoustic waves can enter the microphone housing 244 to impinge on the lower membrane layer 250. The enclosure 262 creates a sealed acoustic cavity 266 on one side of the dual-layer membrane which functions as a microphone back volume, i.e. the sealed acoustic cavity 266 is not in fluid communication with the exterior of the microphone housing 244.

When an acoustic wave enters the microphone housing 244 through the acoustic port 264, it impinges on the lower membrane layer 250. As the acoustic cavity 266 is acoustically isolated from the exterior of the optical microphone 240, the acoustic wave causes a pressure differential across the dual-layer membrane 242. As the upper and lower membrane layers 248, 250 are mechanically coupled by the pillars 252, they move together in unison in response to the pressure differential (i.e. the dual-layer membrane 242 as a whole is deflected). When the dual-layer membrane 242 is deflected, the pillars 252 move within the holes 256 in the support structure 254.

The upper membrane layer 248 has a reflective coating 268 deposited thereon and the support structure 254 has a first and second diffraction gratings 270, 272 forming first and second interferometric arrangements 274, 276 in the same configuration as described with reference to FIG. 1. The readout chip 258 comprises a vertical-cavity surface-emitting laser (VCSEL) 278 and first and second photo detectors 280*a*, 280*b*, together with suitable circuitry (not shown). This allows readout of the optical microphone 240 to be carried out in the same manner as described above for the optical accelerometer 2 with reference to FIGS. 2A-2C to determine the time-varying position of the dual-layer membrane 242 corresponding to the acoustic wave.

In this embodiment, the upper and lower membrane layers 248, 250 together with a peripheral portion 282 of the support structure enclose a volume 284 which is at a lower pressure than the exterior of the optical microphone, e.g. a vacuum. This helps to reduce squeeze film effects between the upper and lower membrane layers 248, 250 and the support structure 254 as the dual-layer membrane 242 moves. This may allow the reflective coating 268 on the upper membrane layer 248 and diffraction gratings 270 on the support structure 254 to be positioned with a smaller gap therebetween, which may improve performance of the microphone.

Figure 14:
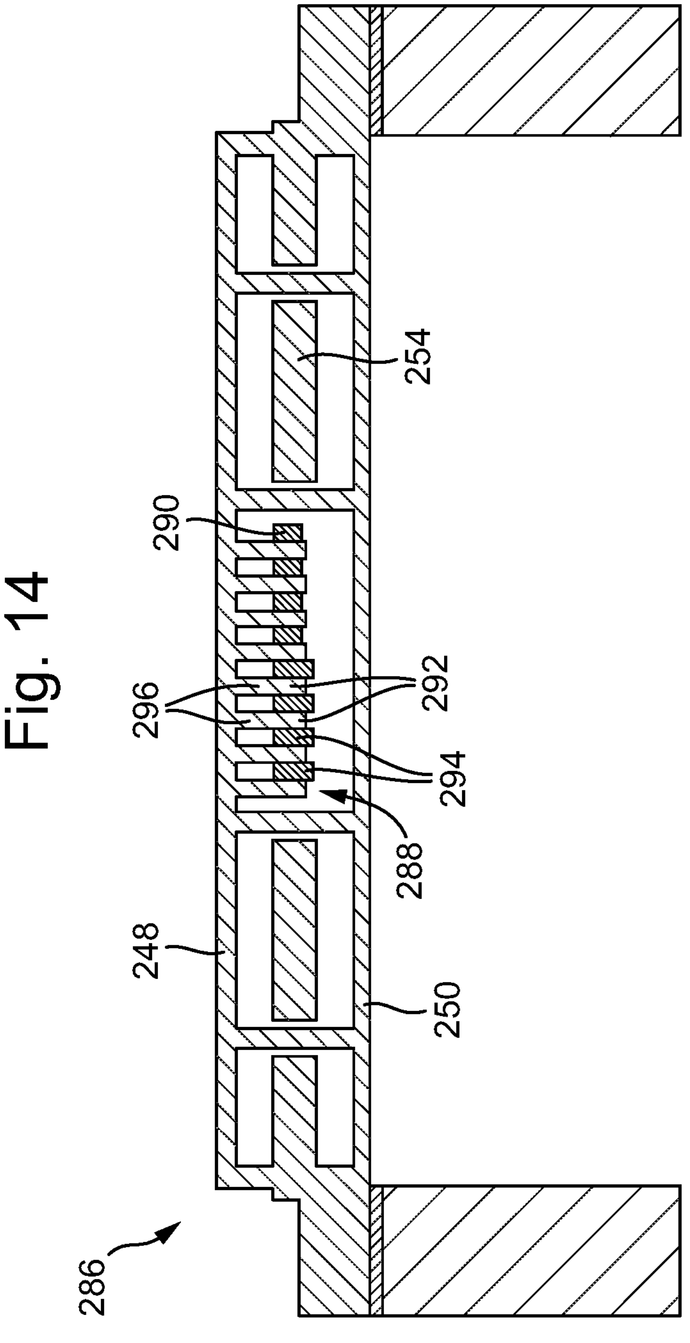
FIG. 14 shows an optical microphone in accordance with a further embodiment of the invention comprising an interferometric arrangement that comprises diffractive structures formed as interlaced fingers.

FIG. 14 show an optical microphone 286 in accordance with a further embodiment of the invention, comprising an interferometric arrangement 288 that comprises diffractive structures formed as interlaced fingers.

The optical microphone 286 has the same structure as the optical microphone 240 of FIG. 13 and functions in the same way, except that instead of the first and second interferometric arrangements 274, 276 comprising the reflective coating 268 and the gratings 270, 272, the optical microphone 286 has an interferometric arrangement 288 with the same structure as the interferometric arrangement 120 of FIG. 10. The readout chip, the base and the enclosure are omitted from FIG. 14 for clarity.

A central region 290 of the support structure 254 has deep openings 292 extending therethrough. The openings 292 are elongate in the direction of a plane of the support structure 254, so that the remaining material between the openings form fingers 294, each having a reflective surface facing the lower membrane layer 250.

The upper membrane layer 248 comprises a plurality of elongate walls 296 protruding towards and through the elongate openings 292 in the support structure 254. A surface of each of the walls 296 facing the lower membrane layer 250 is a reflective surface.

As the dual-layer membrane is deflected, the walls 296 move within the openings 292, so that the reflective surfaces on the walls 296 move in and out of the plane of the reflective surfaces on the support structure 254, functioning as an interferometric arrangement 288 with a variable spacing in the same manner as described above with reference to FIG. 10, except that the dual-layer membrane 242 moves in response to an acoustic wave as described with reference to FIG. 13. The movement of the dual-layer membrane 242 in response to the acoustic wave is then determined using the optical readout techniques previously described.

The volume 284 between the upper and lower membrane layers 248, 250 is at a lower pressure than the exterior of the optical microphone, e.g. a vacuum. This helps to mitigate squeeze film effects that may otherwise result from the shape and interaction of the walls 296 and fingers 294.

It will be appreciated that the embodiments described above are only examples and do not limit scope of the invention. The scope of the invention is defined by the claims.

The invention claimed is:

1. An optical accelerometer comprising:

an interferometric arrangement comprising a first optical element and a second optical element, wherein the first optical element is moveable with respect to the second optical element;

a light source; and at least one photo detector;

wherein the light source is disposed to provide light to the interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the first optical element and the second optical element, and the photo detector is disposed to detect at least part of an interference pattern generated by said first and second portions of light dependent on said optical path difference;

the optical accelerometer further comprising:

a support structure having a position that is static relative to the light source and the at least one photo detector, wherein the second optical element comprises a surface of the support structure and/or is disposed on a surface of the support structure; and a dual-layer membrane that is deflectable relative to the support structure, the dual-layer membrane comprising a first membrane layer, a second membrane layer spaced from the first membrane layer, and at least one proof mass positioned between the first and second membrane layers, wherein the proof mass is attached to or integrally formed with each of the first and second membrane layers so that the first and second membrane layers are mechanically coupled to move together in response to a deflecting force acting on the proof mass, and wherein the first optical element comprises a surface of the first membrane layer or is disposed on a surface of the first membrane layer;

wherein the second optical element and at least part of the support structure are positioned between the first and second membrane layers.

2. The optical accelerometer as claimed in claim 1, where the first and second membrane layers are separated by a distance d, where d is between 3 μm and 1000 μm.

3. The optical accelerometer as claimed in claim 1, wherein the dual-layer membrane has an area that is between 0.2 $mm^2$ and 2 $mm^2$.

4. The optical accelerometer as claimed in claim 1, comprising more than one proof mass.

5. The optical accelerometer as claimed in claim 1, wherein the proof mass has a mass between 1 μg and 5 mg, or wherein the optical accelerometer comprises more than one proof mass and the aggregate mass of all of the proof masses is between 1 μg and 5 mg.

6. The optical accelerometer as claimed in claim 1, wherein the proof mass comprises or is made from silicon, poly-silicon, silicon nitride or a combination of two or more of silicon, poly-silicon and silicon nitride.

7. The optical accelerometer as claimed in claim 1, wherein at least part of the optical accelerometer is manufactured using surface micromachining.

8. The optical accelerometer as claimed in claim 1, comprising pillars extending between the first and second membrane layers, wherein the pillars are attached to or integrally formed with the first and second membrane layers.

9. The optical accelerometer as claimed in claim 1, wherein the first optical element comprises a first plurality of elongate reflective surfaces and a first plurality of elongate openings arranged alternately with the first plurality of elongate reflective surfaces to form a first diffractive structure in a first plane; and the second optical element comprises a second plurality of elongate reflective surfaces and a second plurality of elongate openings arranged alternately with the second plurality of elongate reflective surfaces to form a second diffractive structure in a second plane; wherein the first and second planes are co-planar either when the dual-layer membrane is in an equilibrium position or when the dual-layer membrane is in a deflected position; and wherein when the first and second planes are co-planar, the first plurality of elongate reflective surfaces are positioned in the second plurality of elongate openings.

10. The optical accelerometer as claimed in claim 1, wherein a volume between the first and second membrane layers is fully enclosed.

11. The optical accelerometer as claimed in claim 10, wherein the volume between the first and second membrane layers is at a lower pressure than an ambient pressure of a region immediately outside of the volume between the first and second membrane layers.

12. The optical accelerometer as claimed in claim 1, wherein the optical accelerometer or at least part thereof is sealed inside a packaging wherein a volume inside the packaging is at a lower pressure than an ambient pressure of a region immediately outside of the packaging.

13. The optical accelerometer as claimed in claim 1, wherein the optical accelerometer is configured to use closed loop feedback to balance a force on the proof mass due to gravity or to damp a resonance in the accelerometer response to an acceleration.

14. A method of manufacturing a deflectable dual-layer membrane for an optical accelerometer, the method comprising:

i) depositing a bottom membrane layer over a substrate wafer;

ii) depositing a sacrificial layer over the bottom membrane layer;

iii) etching at least one cavity in the sacrificial layer, wherein the at least one cavity extends through the sacrificial layer to expose a respective area of the bottom membrane layer;

iv) depositing proof mass material to fill the or each cavity;

v) depositing a top membrane layer over the sacrificial layer and the proof mass material;

vi) etching one or more holes in the top membrane layer to expose respective areas of the sacrificial layer;

vii) removing at least part of the sacrificial layer to leave a void between the top and bottom membrane layers and around the proof mass material, so that the proof mass material is attached to or integrally formed with the top and bottom membrane layers; and viii) etching the substrate wafer beneath the bottom membrane layer to remove a portion of the substrate wafer, leaving a peripheral portion of the substrate wafer supporting the bottom and top membrane layers, such that the bottom membrane layer, the proof mass material and the top membrane layer together form the deflectable dual-membrane structure.

15. The method of claim 14, further comprising:

depositing a support structure layer over the sacrificial layer; and depositing a further sacrificial layer over the support structure layer, wherein the step of depositing the top membrane layer comprises depositing the top membrane layer over (e.g. directly on) the further sacrificial layer;

wherein the step of etching at least one cavity in the sacrificial layer comprises etching the at least one cavity through the further sacrificial layer, the support structure layer and the sacrificial layer; and wherein the step of removing at least part of the sacrificial layer to leave a void between the top and bottom membrane layers comprises removing at least part of the further sacrificial layer.

16. The method of claim 14, comprising providing a first optical element in or on the bottom membrane layer or the top membrane layer.

17. The method of claim 14, comprising providing a second optical element in or on the support structure layer.

18. The method of claim 14, comprising plugging the holes in the top membrane layer.

19. The method of claim 18, comprising adjusting a pressure in the void prior to plugging the holes in the top membrane layer.

20. The method of claim 14, wherein the proof mass material is silicon nitride, poly-silicon, silicon, or a combination of two or more of silicon nitride, poly-silicon and silicon.

* * * * *